United States Patent [19]
Kessler et al.

[11] Patent Number: 5,761,706
[45] Date of Patent: Jun. 2, 1998

[54] STREAM BUFFERS FOR HIGH-PERFORMANCE COMPUTER MEMORY SYSTEM

[75] Inventors: Richard E. Kessler, Eau Claire; Steven M. Oberlin, Chippewa Falls; Steven L. Scott, Eau Claire; Subbarao Palacharla, Madison, all of Wis.

[73] Assignee: Cray Research, Inc., Eagan, Minn.

[21] Appl. No.: 333,133

[22] Filed: Nov. 1, 1994

[51] Int. Cl.$^6$ ................................................ G06F 12/00
[52] U.S. Cl. ........................................................ 711/118
[58] Field of Search ................ 364/DIG. 1, DIG. 2; 395/401, 403, 414, 421.03, 427, 428, 436, 445, 446, 449, 460, 461, 464, 467, 471

[56] References Cited

U.S. PATENT DOCUMENTS

| | | | |
|---|---|---|---|
| 5,261,066 | 11/1993 | Jouppi et al. | 395/425 |
| 5,317,718 | 5/1994 | Jouppi | 395/425 |
| 5,345,560 | 9/1994 | Miura et al. | 395/250 |
| 5,371,870 | 12/1994 | Goodwin et al. | 395/425 |
| 5,386,547 | 1/1995 | Jouppi | 395/400 |

OTHER PUBLICATIONS

Rambus —"Using Rambus Technology in Pentium–Based Systems" —pp. 1–75.

J.E. Smith, et al., Cray Research, Inc. "Prefetching in Supercomputer Instruction Caches" —pp. 588–597.

Linley Gwennap, Microprocessor Report, "MacroTek to Sell VME Chip Set for PowerPC, German Start–Up Markets Two–Chip Set for System Logic," Aug. 2, 1993, pp. 8–9.

R.E. Kessler, et al., IEEE Transactions on Computers, "A Comparison of Trace–Sampling Techniques for Multi–Megabyte Caches," vol. 43, No. 6, Jun. 1994, pp. 664–675.

Norman P. Jouppi, "Improving Direct–Mapped Cache Performance by the Addition of a Small Fully–Associative Cache and Prefetch Buffers," *The 17th Annual International Symposium on Computer Architecture*, 364–373 (May 1990).

(List continued on next page.)

*Primary Examiner*—Robert B. Harrell
*Attorney, Agent, or Firm*—Schwegman, Lundberg, Woessner & Kluth, P.A.

[57] ABSTRACT

Method and apparatus for a filtered stream buffer coupled to a memory and a processor, and operating to prefetch data from the memory. The filtered stream buffer includes a cache block storage area and a filter controller. The filter controller determines whether a pattern of references has a predetermined relationship, and if so, prefetches stream data into the cache block storage area. Such stream data prefetches are particularly useful in vector processing computers, where once the processor starts to fetch a vector, the addresses of future fetches can be predicted based in the pattern of past fetches. According to various aspects of the present invention, the filtered stream buffer further includes a history table, a validity indicator which is associated with the cache block storage area and indicates which cache blocks, if any, are valid. According to yet another aspect of the present invention, the filtered stream buffer controls random access memory (RAM) chips to stream the plurality of consecutive cache blocks from the RAM into the cache block storage area. According to yet another aspect of the present invention, the stream data includes data for a plurality of strided cache blocks, wherein each of which these strided cache blocks corresponds to an address determined by adding to the first address an integer multiple of the difference between the second address and the first address. According to yet another aspect of the present invention, the processor generates three addresses of data words in the memory, and the filter controller determines whether a predetermined relationship exists among three addresses, and if so, prefetches strided stream data into said cache block storage area.

45 Claims, 21 Drawing Sheets

OTHER PUBLICATIONS

Jean–Loup Baer et al., "An Effective On–Chip Preloading Scheme to Reduce Data Access Penalty," *Proceedings of Supercomputing '91*, 176–186 (Nov. 1991).

John W. C. Fu et al., "Data Prefetching in Multiprocessor Vector Cache Memories," *The 18th Annual International Symposium On Computer Architecture*, 54–63 (May 1991).

J.W.C. Fu et al., "Stride Directed Prefetching in Scalar Processors," *The 25th Annual International Symposium on Microarchitecture*, 102–110 (Dec. 1992).

Ivan Sklenar, "Prefetch unit for vector operations on scalar computers," *Computer Architecture News*, 20, 31–37 (Sep. 1992).

Alan J. Smith, "Cache memories," *ACM Computing Surveys*, 14, 473–530 (Sep. 1982).

Kimming So, et al., "Cache Operations by MRU Change," *IEEE Transactions on Computers*, 37 700–709 (Jun. 1988).

David Callahan, et al., "Software prefetching," *Fourth International Conference on Architectural Support for Programming Languages and Operating Systems*, 40–52 (Apr. 1991).

Todd C. Mowry, et al., "Design and Evalution of a Compiler Algorithm for Prefeteching," Fifth International Conference on Architectural Support for Programming Languages and Operating Systems, 62–73 (Oct. 1992).

Subbarao Palacharla, et al., "Evaluating Stream Buffers as a Secondary Cache Replacement," *The 21st Annual International Symposium on Computer Architecture*, 24–33, (Apr. 1994).

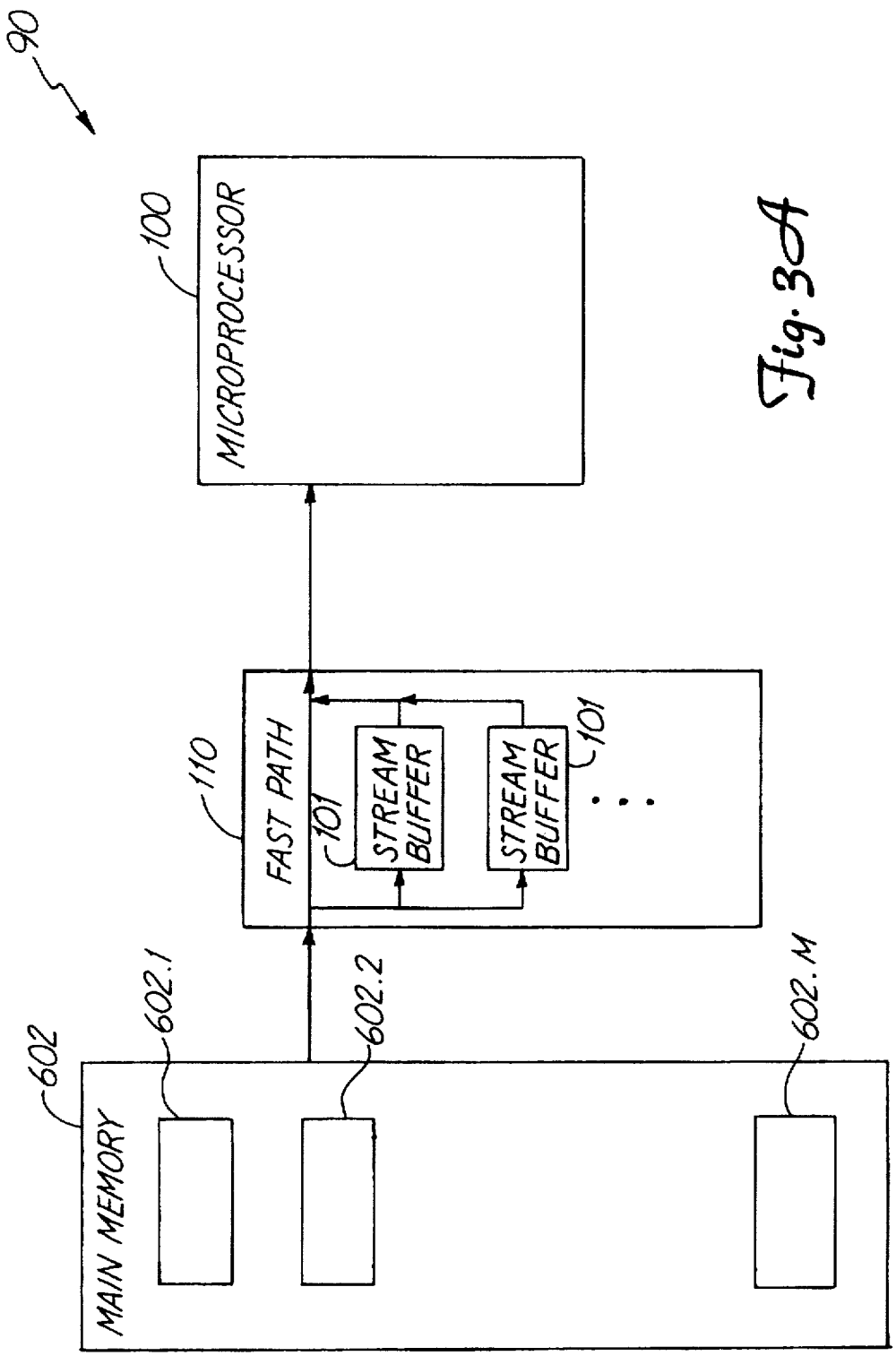

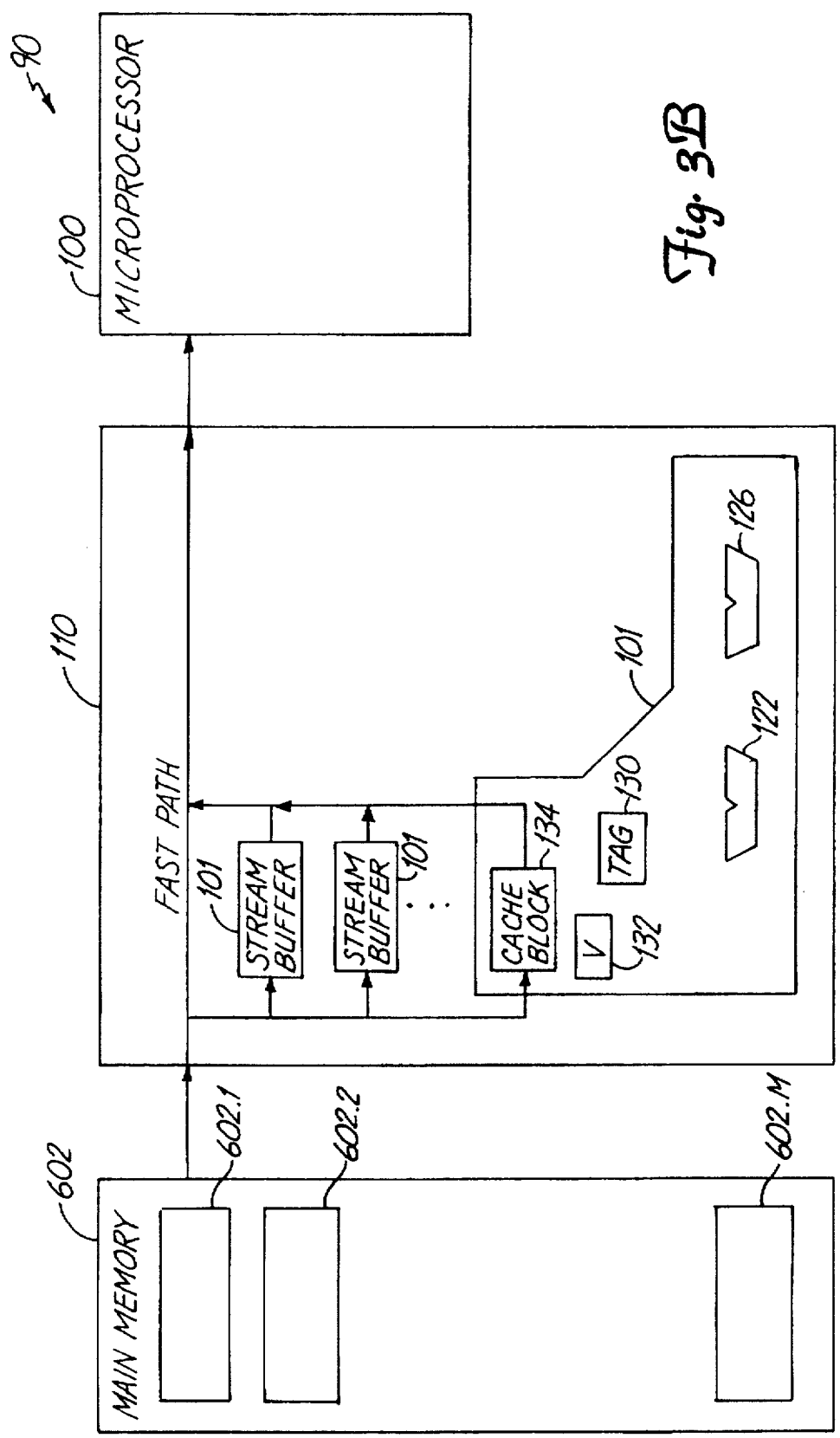

AGGRESSIVENESS OPTIONS

NO_STREAMS → NO PREFETCHES GENERATED. ESTABLISHED STREAMS MAY BE MAINTAINED

DETECT_STREAMS → STREAM DETECTION VIA HISTORY BUFFER MECHANISM. (e.g., TWO SEQUENTIAL REFERENCES REQUIRED TO START A STREAM)

INITIAL_PREFETCH → MISSES NOT DETECTED TO BE SEQUENTIAL PREFETCHED (1-DEEP) INTO IP BUFFER. IP OR HISTORY BUFFER HITS BECOME "TRUE" STREAMS

AGGRESSIVE_PREFETCH → INITIAL PREFETCH & M-CHIP PREFETCHING ENABLED ON INITIAL PREFETCHES. (OTHERWISE ONLY "TRUE" STREAM REFERENCES CAUSE M-CHIP PREFETCHING.)

| NAME | DESCRIPTION | INPUT DATA SET | DATA SET SIZE (MB) | DATA MISS RATE (%) | MPI |
|---|---|---|---|---|---|
| | | NAS | | | |
| EMBAR | EMBARASSINGLY PARALLEL | n=2²⁸ | 1.0 | 0.28 | 0.10 |
| MGRID | MULTIGRID KERNEL | 32×32×32 GRID | 1.0 | 0.84 | 0.08 |
| CGM | SMALLEST EIGEN-VALUE OF A SPARSE MATRIX | 1400×1400 MATRIX, 78148 NON-ZERO ELEMENTS | 2.9 | 3.33 | 1.43 |
| FFTPDE | 3-D PDE SOLVER USING FFT | 64×64×64 COMPLEX ARRAY | 14.7 | 3.08 | 0.50 |
| BUK | INTEGER SORT | 64 K INTEGERS, MAXKEY=2048 | 0.80 | 0.53 | 0.20 |
| APPSP | FLUID DYNAMICS | 24×24×24 GRID, 50 ITERATIONS | 2.2 | 2.24 | 0.38 |
| APPBT | FLUID DYNAMICS | 18×18×18 GRID, 30 ITERATIONS | 4.2 | 1.88 | 0.45 |
| APPLU | FLUID DYNAMICS | 18×18×18 GRID, 50 ITERATIONS | 5.4 | 1.26 | 0.18 |
| | | PERFECT | | | |
| SPEC77 | WEATHER SIMULATION | — | 1.3 | 0.50 | 0.15 |
| ADM | AIR POLLUTION | 64×1×16 GRID, 720 TIME STEPS | 0.6 | 0.04 | 0.00 |
| BDNA | NUCLEIC ACID SIMULATION | 500 MOLECULES, 20 COUNTER IONS | 2.1 | 1.39 | 0.42 |
| DYFESM | STRUCTURAL DYNAMICS | 4 ELEMENTS, 1000 TIME STEPS | 0.1 | 0.01 | 0.00 |
| MDG | LIQUID WATER SIMULATION | 343 MOLECULES, 100 TIME STEPS | 0.2 | 0.03 | 0.01 |
| QCD | QUANTUM CHROMODYNAMICS | 12×12×12 LATTICE | 9.2 | 0.16 | 0.06 |
| TRFD | QUANTUM MECHANICS | — | 8.0 | 0.05 | 0.00 |

BENCHMARK CHARACTERISTICS

| BENCHMARK | INPUT SIZE | STREAM HIT-RATE (%) | MINM. L2 CACHE SIZE FOR SAME HIT-RATE |
|---|---|---|---|
| APPSP | 12×12×12 | 43 | 128 KB |
| | 24×24×24 | 65 | 1 MB |
| APPBT | 12×12×12 | 50 | 512 KB |
| | 24×24×24 | 52 | 2 MB |
| APPLU | 12×12×12 | 62 | 1 MB |
| | 24×24×24 | 73 | 2 MB |
| CGM | 1400×1400,78148 | 85 | 1 MB |
| | 5600×5600,98148 | 51 | 64 KB |
| MGRID | 32×32×32 | 76 | 2 MB |
| | 64×64×64 | 88 | 4 MB |

STREAM BUFFERS VERSUS SECONDARY CACHE

*Fig. 12*

| BENCHMARK | EXTRA BANDWIDTH REQUIRED (%) |
|---|---|
| NAS ||
| EMBAR | 8 |
| CGM | 30 |
| MGRID | 36 |
| FFTPDE | 158 |
| IS | 48 |
| APPSP | 134 |
| APPBT | 62 |
| APPLU | 38 |
| PERFECT ||
| SPEC77 | 44 |
| ADM | 150 |
| BDNA | 68 |
| DYFESM | 108 |
| MDG | 76 |
| QCD | 74 |
| TRFD | 96 |

EXTRA BANDWIDTH CONSUMED BY ORDINARY STREAMS

Fig. 14

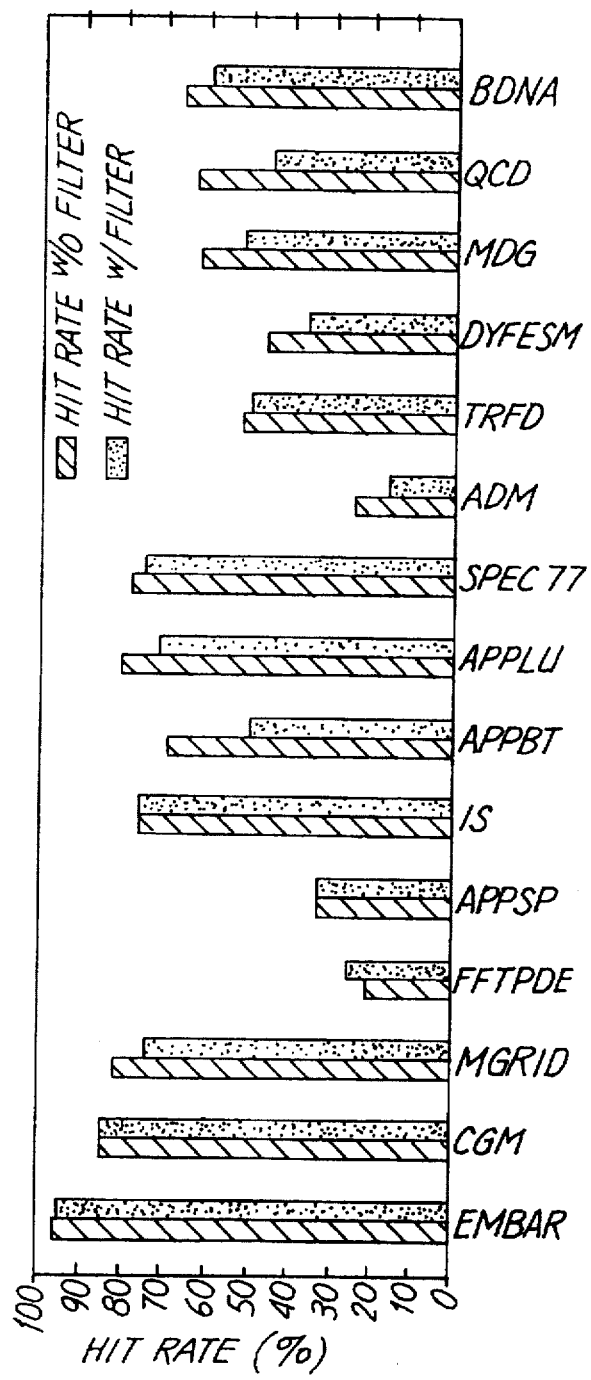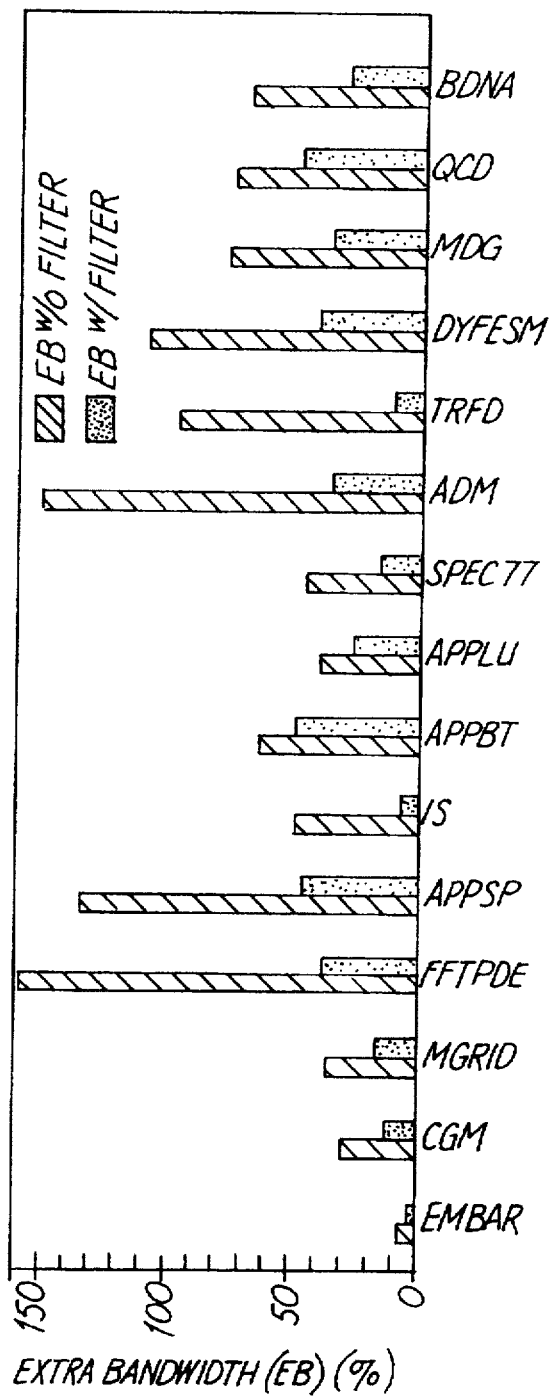

| BENCHMARK | LENGTH DISTRIBUTION (% HITS) | | | | |
|---|---|---|---|---|---|
| | 1-5 | 6-10 | 11-15 | 16-20 | >20 |
| NAS | | | | | |
| EMBAR | 1 | 0 | 0 | 0 | 99 |
| MGRID | 13 | 1 | 0 | 0 | 86 |
| CGM | 3 | 0 | 0 | 0 | 97 |
| FFTPDE | 41 | 0 | 0 | 0 | 59 |
| IS | 4 | 2 | 1 | 0 | 93 |
| APPSP | 5 | 0 | 11 | 0 | 84 |
| APPBT | 63 | 0 | 0 | 0 | 37 |
| APPLU | 22 | 3 | 4 | 7 | 64 |
| PERFECT | | | | | |
| SPEC77 | 14 | 1 | 1 | 0 | 84 |
| ADM | 73 | 12 | 5 | 1 | 9 |
| BDNA | 36 | 17 | 8 | 5 | 33 |
| DYFESM | 50 | 17 | 7 | 1 | 25 |
| MDG | 32 | 9 | 7 | 6 | 46 |
| QCD | 50 | 6 | 1 | 0 | 43 |
| TRFD | 7 | 2 | 1 | 0 | 90 |

DISTRIBUTION OF STREAM LENGTHS

*Fig. 16*

HIT-RATE SENSITIVITY TO CZONE SIZE

STREAM BUFFERS FOR HIGH-PERFORMANCE COMPUTER MEMORY SYSTEM

FIELD OF THE INVENTION

The present invention relates to methods and apparatus for computer cache memories and more specifically to stream buffer caches for computers.

BACKGROUND OF THE INVENTION

One way to improve the performance of microprocessors is to reduce the latency time of the memory system. Conventional computer systems attempt to reduce average latency by providing a hierarchy of memories including small, fast memories placed close to the processor and slower, bulk memories placed further from the processor. In such systems, a microprocessor is typically designed with a small internal cache. That cache is then supplemented with an external large secondary cache which has relatively fast data access times. For instance, a highperformance workstation may contain a processor having an on-chip cache augmented by an off-chip secondary cache of 128KB to a megabyte or more of static random-access memory (SRAM), and a main memory of dynamic random-access memory (DRAM) which is typically even larger. However, such large secondary caches are relatively expensive, particularly when repeated many times within largescale parallel systems with many processors (and thus many caches).

In a conventional massively parallel processing system, processors are distributed as nodes within a network topology. In addition, each node may contain local memory places proximate to the processor. One such massively parallel processing system is described in U.S. patent application Ser. No. 08/165,266 filed Dec. 10, 1993, which is hereby incorporated by reference.

Stream buffers have been proposed as alternatives or supplements for secondary caches. One such system is described by Norman P. Jouppi, "Improving Direct-Mapped Cache Performance by the Addition of a Small Fully-Associative Cache and Prefetch Buffers," THE 17TH ANNUAL INTERNATIONAL SYMPOSIUM ON COMPUTER ARCHITECTURE, pages 364–373, May 1990, (hereinafter "Jouppi").

Referring to FIG. 1, Jouppi describes a stream buffer 10 that includes a FIFO prefetch buffer which prefetches consecutive cache blocks into the stream buffer from a next-lower memory component (e.g., secondary cache or main memory) based on the most-recent address presented by a processor, and feeds the prefetched cache block into a direct-mapped cache 12. If the next address from the processor does not match the cache-block-address tag of the "head" entry (the entry which will be read out first), the stream buffer is flushed, and prefetching again starts from the new address. Referring to FIG. 2, Jouppi also describes a plurality of stream buffers 10 connected in parallel (called "multi-way stream buffers") that accommodate interleaved streams of data from different sources. For example, FIG. 2 shows four stream buffers in parallel. Jouppi states that when a miss occurs in the data cache that does not hit in any stream buffer, the stream buffer hit least recently (i.e., the least-recently-used (LRU) entry) is cleared, and that stream buffer then starts fetching at the miss address.

One problem encountered with a stream buffer implementation as described by Jouppi is that there are often times many references which are not part of a consecutive data-access pattern. These references nonetheless cause a stream buffer to start prefetching consecutive cache blocks of data, thus wasting valuable bandwidth of the main memory or next-lower level of cache.

Baer and Chen (Jean-Loup Baer and Tien-Fu Chen, "An effective onchip preloading scheme to reduce data access penalty," PROCEEDINGS OF SUPERCOMPUTING '91, pages 176–186, November 1991) proposed an on-chip scheme that detects strides in program references using history tables. A hardware table (maintained as a cache), called the reference prediction table, keeps currently active load/store instructions and predicts future references. Fu and Patel (John W. C. Fu and Janak H. Patel, "Data prefetching in multiprocessor vector cache memories," THE 18TH ANNUAL INTERNATIONAL SYMPOSIUM ON COMPUTER ARCHITECTURE, pages 54–63, May 1991) describe using the stride information encoded in vector instructions to prefetch data for vector processors. They also suggest a scheme (J. W. C. Fu and J. H. Patel, "Stride-directed prefetching in scalar processors," PROCEEDINGS OF THE 25TH MICRO, pages 110–112, 1992) for scalar processors that is similar to the Baer and Chen scheme. Another similar scheme is suggested by Sklenar (Ivan Sklenar, "Prefetch unit for vector operations on scalar computers," ACM COMPUTER ARCHITECTURE NEWS, 20(4):31–37, September 1992). Note that all of these hardware schemes make use of the program counter (PC) of the load/store instruction to implement prefetching. This is a significant disadvantage since it requires that commodity processors be modified to insert prefetch logic.

Rambus Inc. has developed a memory system (Craig Hampel, "Using Rambus technology in Pentium-based systems," 1993) that consists of a small (about 1 kilobyte, or "KB") prefetching secondary cache backed by high-bandwidth Rambus DRAMS. They find that for typical corporate applications their cache achieves hit rates that are comparable to those shown by conventional Pentium system implementations with a 256 KB secondary cache and 64-bit interleaved DRAM memory. Smith (Alan J. Smith, "Cache memories," ACM COMPUTING SURVEYS, 14(3):473–530, September 1982) evaluated schemes based on the one-block-look-ahead (OBLA) policy of prefetching block i+1 whenever block i is referenced. As an extension to OBLA, Jouppi suggested stream buffers (Norman P. Jouppi, "Improving Direct-Mapped Cache Performance by the Addition of a Small Fully-Associative Cache and Prefetch Buffers," THE 17TH ANNUAL INTERNATIONAL SYMPOSIUM ON COMPUTER ARCHITECTURE, pages 364–373, May 1990). Jouppi suggested using stream buffers on-chip to prefetch data at the maximum bandwidth of the second level cache. So and Rechtschaffen (Kimming So and Rudolph N. Rechtschaffen, "Cache operations by MRU change," IEEE TRANSACTIONS ON COMPUTERS, C-37 (6), June 1988) suggest using a reference to a non-MRU (non-most-recently used) block to trigger prefetches.

Several schemes for compiler prefetching of data have been suggested. Porterfield et al. (David Callahan, Ken Kennedy, and Allan Porterfield, "Software prefetching," FOURTH INTERNATIONAL CONFERENCE ON ARCHITECTURAL SUPPORT FOR PROGRAMMING LANGUAGES AND OPERATING SYSTEMS, pages 40–52, April 1991) looked at prefetching array references within inner loops and used a simple heuristic of prefetching cache blocks a single loop iteration in advance. Mowry, Lam, and Gupta (Todd C. Mowry, Monica S. Lam, and Anoop Gupta, "Design and evaluation of a compiler algorithm for prefetching," FIFTH INTERNATIONAL CONFERENCE ON ARCHITECTURAL SUPPORT FOR PRO- GRAMMING LANGUAGES AND OPERATING SYSTEMS, pages 62–73, October 1992) presented a compiler algorithm to perform prefetch insertion. Their compiler takes into account data reuse to eliminate unnecessary prefetches. They show that selective prefetching is better than indiscriminate prefetching. While more flexible than hardware prefetching, software prefetching has a few disadvantages. Prefetch instructions require extra cycles for their execution. Perhaps even more importantly, they consume external or pin bandwidth of the commodity processor chip. Also, software may not be able to predict conflict or capacity cache misses, so unnecessary prefetches may be executed while the data are already in the cache.

What is needed is an improved stream buffer apparatus and method to reduce the memory bandwidth requirements and achieve improved performance and reduced cost.

SUMMARY OF THE INVENTION

The present invention teaches a method and apparatus for a filtered stream buffer coupled to a memory and a processor, and operating to prefetch data from the memory. The stream buffer includes a cache block storage area and a filter controller. The filter controller determines whether a second address has a predetermined relationship to a first address, and if so, prefetches stream data into the cache block storage area. Such stream data prefetches are particularly useful in vector processing computers where, once the processor starts to fetch a vector, the addresses of future fetches can be predicted based in the pattern of past fetches.

According to one aspect of the present invention, the stream buffer further includes a history table.

According to another aspect of the present invention, the stream buffer further includes a validity indicator which is associated with the cache block storage area. The validity indicator indicates which cache blocks, if any, are valid.

According to yet another aspect of the present invention, the stream buffer controls random access memory (RAM) chips to stream the plurality of consecutive cache blocks from the RAM into the cache block storage area.

According to yet another aspect of the present invention, the predetermined relationship is that the second address corresponds to a second cache block which has an address larger than the address of a first cache block corresponding to the first address, and the prefetch of stream data is based in a stride between the second and first addresses.

According to yet another aspect of the present invention, the stream data includes data for a plurality of strided cache blocks, wherein each of which these strided cache blocks corresponds to an address determined by adding to the first address an integer multiple of the difference between the second address and the first address.

According to yet another aspect of the present invention, the stream buffer controls random access memory (RAM) chips to stream data for the strided cache blocks from the RAM into the cache block storage area. In one such embodiment, the stream buffer is directly connected to and controlling DRAM chips which have a fast mode to stream data into the stream buffer.

According to yet another aspect of the present invention, the stream buffer further includes an cache-block-address tag corresponding to a cache block in the cache block storage area; an address-hit comparator coupled to the cache-block-address tag and to the processor; and a filter comparator coupled to the history table and to the processor, wherein: the address-hit comparator determines whether a miss exists between the first address and a value in the cache-block-address tag and, if so, the filter controller stores a first value based on the first address into the history table; and the address-hit comparator determines whether a miss exists between the second address and a value in the cache-block-address tag and, if so, the filter controller uses the filter comparator to determine whether the second address has a predetermined relationship to the first value.

According to yet another aspect of the present invention, the processor generates three addresses of data words in the memory, and the filter controller determines whether a predetermined relationship exists among three addresses, and if so, prefetches strided stream data into said cache block storage area.

According to yet another aspect of the present invention, the predetermined relationship is that a stride between said third address and said first address substantially equals a stride between said first address and said second address.

According to yet another aspect of the present invention, the stream depth of prefetching cache blocks is based on a parameter contained in a program running in said processor, thus controlling the aggressiveness of the depth of prefetching.

According to yet another aspect of the present invention, the test of the predetermined relationship based on a parameter contained in a program running in said processor thus controlling the aggressiveness of the initial prefetch.

BRIEF DESCRIPTION OF THE DRAWINGS

FIG. 3A is a schematic diagram illustrating a computer system including a multi-way stream buffer.

FIG. 3B is a schematic diagram illustrating a computer system including a filtered multi-way stream buffer.

FIG. 10 is a table showing aggressiveness options for a filtered stream buffer.

FIG. 11 is a table of performance benchmarks and some of their attributes.

FIG. 12 is a table of stream buffer hit rates for various benchmarks, and a comparison to the minimum size of a second-level cache required to achieve the same hit rate.

FIG. 14 is a table of performance benchmarks showing the extra bandwidth consumed.

FIG. 15A is a graph showing hit-rate with and without a unit-stride filter for various benchmarks.

FIG. 15B is a graph showing extra bandwidth required with and without a unit-stride filter for various benchmarks.

FIG. 16 is another table of performance benchmarks and some of their attributes.

DESCRIPTION OF THE PREFERRED EMBODIMENT

Figure 1:
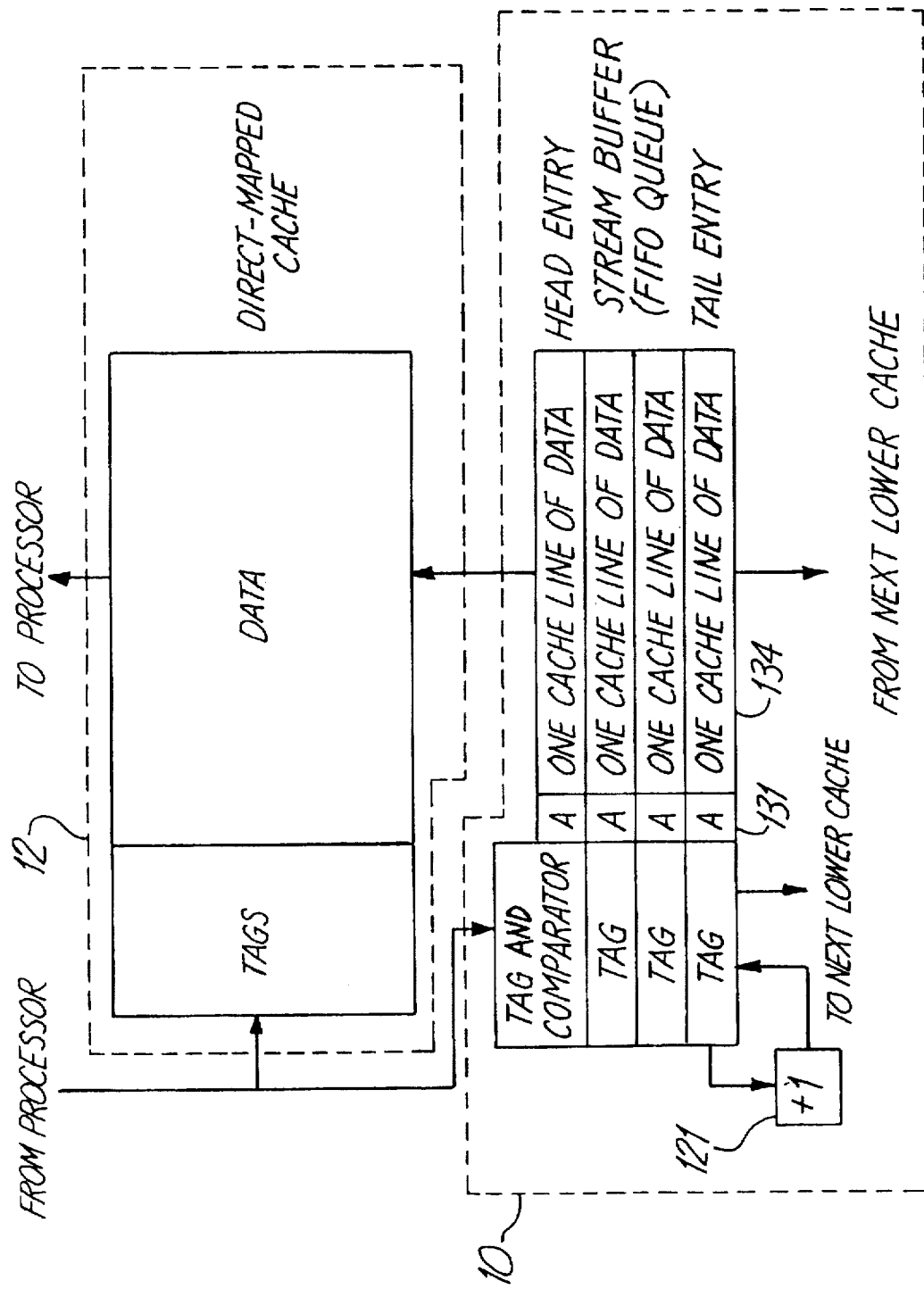
FIG. 1 is a schematic diagram illustrating a prior-art stream buffer.
Figure 2:
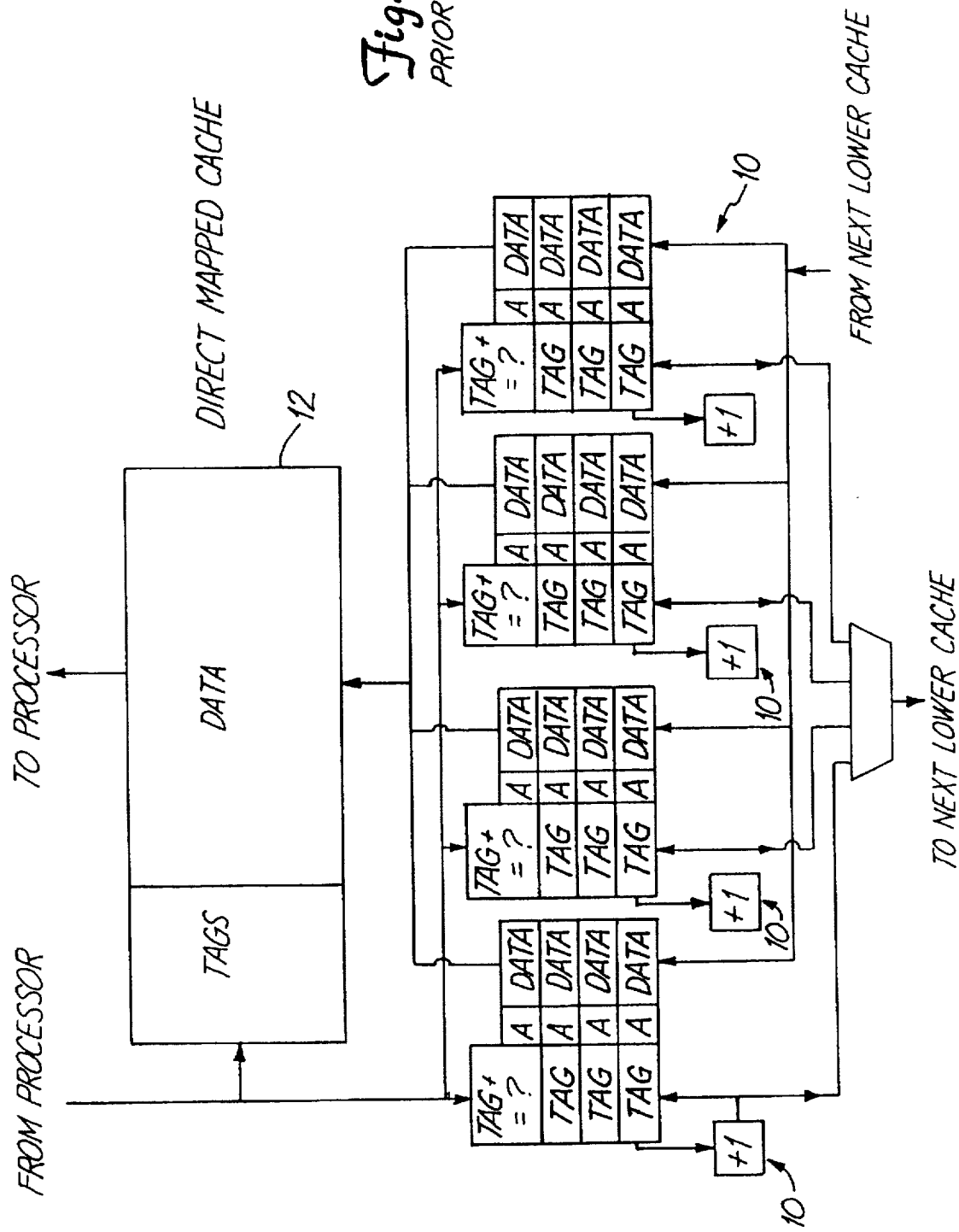
FIG. 2 is a schematic diagram illustrating a prior-art multi-way stream buffer.

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

It is advantageous to replace or supplement the secondary cache with stream buffers. Stream buffers require much less hardware to implement, yet can provide performance similar to a large secondary cache for scientific programs. Some of the cost savings achieved by replacing the expensive secondary cache with cheaper stream buffers can be applied towards implementing better main memory bandwidth, and the resulting system will likely have both significantly higher overall performance and system cost-efficiency, particularly for typical scientific programs that have regular access patterns. Memory system efficiency is particularly critical within the context of large-scale parallel machines (on the order of one thousand or more processors) because the costs of any inefficiencies are magnified by the scale of the system. Gigabytes of static random access memory (SRAM) are required to implement a conventional workstation memory-system design having caches for each processor in these parallel systems. This is an exorbitant cost if the caches are not being effectively used.

In the literature, the terms "streams," "buffers," and "stream buffers" are sometimes used interchangeably. Here, a "stream" is defined as a series or pattern of memory references (for either data or instructions); "buffers" are storage areas which can hold data; and "stream buffers" are buffers which prefetch and hold data which has been predicted to be part of a stream. This prediction is made by examining memory references made up to a point in time, and determining whether those references match some predetermined pattern for which a prediction may be made as to likely patterns of future references. One aspect of memory references is the pattern of addresses used. Another aspect is the type of data fetched. Yet another aspect is the contents of the data fetched. The prediction can be made entirely by hardware at runtime, or can be supplemented by determinations made by the programmer or the compiler which are then passed as a parameter in the program to the hardware controlling the prefetch buffers.

"Stream buffers" are buffers that prefetch cache blocks. In one such embodiment, FIFO prefetch buffers are used for the stream buffers. FIG. 3A is a schematic diagram illustrating a computer system including a multi-way stream buffer. FIG. 3A illustrates the logical organization of a typical single processor system 90 including stream buffers (or one of a plurality of substantially similar processors 90 in a large massively parallel system). System 90 includes microprocessor 100, connected to filtered stream buffer module 110 and a main memory 602. "Memory" for main memory 602 may include a secondary cache; main memories, such as those implemented with dynamic random access memories (DRAMs), static random access memories (SRAMs) and video random access memories (VRAMs); and mass storage devices such as hard magnetic disks, optical disks, and magnetic tape units. Filtered stream buffer module 110 prefetches cache blocks from the main memory 602 resulting in faster service of on-chip misses than in a system 90 with only on-chip caches and main memory 602. Filtered stream buffer module 110 will be most effective in systems with "sufficient" main memory bandwidth, since some extra memory bandwidth is inevitably wasted by prefetching data words which go unused. The filtering technique of the present invention can, however, be used to minimize the excess memory bandwidth required. ("Filtering" is defined here as choosing a subset of all memory accesses which will more likely benefit from use of a stream buffer 101, and allocating a stream buffer 101 only for accesses in this subset.) Compared to secondary caches, filtered stream buffer module 110 requires very little logic, and it is found that they "scale" better (i.e., as the scale of the overall system grows, the cost and complexity of the stream buffers grows proportionately, not exorbitantly) with larger scientific data sets.

Stream buffers were evaluated for a large number of scientific application codes (fifteen applications), and the types of these programs that benefit most from stream buffers were determined. It was shown that, for the majority of programs examined, stream buffers can reach good performance levels (hit ratio≧50%). It was also shown that using conventional stream buffers could result in considerably inefficient use of memory bandwidth, and that memory-bandwidth efficiency can be improved by adding a filter. An implementation is described to extend stream buffers to handle the case of non-unit-stride memory-access patterns. Stream-buffer performance is also compared to that of secondary caches, indicating the relatively better scalability of stream buffers to larger data-set sizes.

Referring to FIG. 3B, each entry of a stream buffer 101 includes a cache-block-address tag 130, a validity indicator 132, and a cache block 134. A stream buffer 101 has one or more entries, where each entry consists of a cache block 134 holding cache block data, a cache-block-address tag 130 corresponding to the address for the cache block and a validity indicator 132. In addition, an adder 122 is used to generate prefetch addresses and a comparator 126 is used to match the miss address with the cache-block-address tag 130 of the cache block 134 at the head of the stream buffer 101. In one embodiment, stream buffers 101 are FIFO prefetch buffers that prefetch consecutive cache blocks starting at a given address. When a reference misses in the on-chip cache, it allocates a stream buffer 101 and prefetches cache blocks starting at the miss target. The adder 122 generates the address of the next cache block to be prefetched. When a cache block returns from main memory, the stream buffer hardware fills the tag 130 and data 134 fields of the entry and sets the validity indicator 132.

Subsequent primary cache misses compare their address against the head of the stream buffer. If the reference hits in the stream buffer, the processor pulls the cache block into the primary cache. Write-backs bypass the stream buffers and on their way to memory invalidate any stale copies that might be present in the stream buffers. Compared to second-level caches, stream buffers require little hardware. Each buffer needs a comparator and an adder in addition to a small amount of SRAM for the cache blocks. Also, the access time for stream buffers can be smaller than that of second-level caches, as there is no RAM look-up involved.

Since most programs access more than one array inside a loop, system performance often benefits by using more than one stream buffer in parallel. Multi-way stream buffers help in prefetching multiple data streams concurrently. The primary-cache-miss address is compared with the head of each stream in parallel. If the reference hits in one of the stream buffers, the cache block is transferred to the primary cache; otherwise, the oldest stream is flushed and reset to prefetch from the miss address. It was assumed that a least-recently-used (LRU) replacement policy selects the stream to be reallocated. It was found that the number of stream buffers needed was sufficiently small (eight or less), so that the parallel search mentioned above would not cause any significant access time increase.

While Jouppi considered stream buffers prefetching from a large secondary cache into a primary cache, one embodiment of the present invention instead considers prefetching directly from the main memory into buffers close to the processor chip.

As used in the description of the present invention, a "stride" is defined as the difference between successive addresses in a pattern of address accesses. A "simple stride" has a constant value, wherein each successive address is the same space away from its respective previous address. A "unit stride" is a simple stride which has data in each of a series of consecutive cache blocks, and thus causes consecutive cache blocks to be fetched. A "non-unit stride" is a simple stride which has data in a pattern which skips at least some cache blocks of a series of consecutive cache blocks, and thus would allow some cache blocks to be skipped. For example, for a stream of accesses starting at word 0, having a stride of 12 and a cache block length of 8, every third cache block fetch could be skipped and yet retrieve all needed data (cache block 0-7 would contain word 0, cache block 8-15 would contain word 12, cache block 16-23 could be skipped, cache block 24-31 would contain word 24, cache block 32-39 would contain word 36, cache block 40-47 could be skipped, etc.) A more complex stride has a repeating pattern of spaces between addresses. An even more complex stride has a non-repeating, but a predictable or specifiable pattern of spaces between successive addresses.

As used here, "sequential" is defined as being part of a sequence or series of strided accesses, which can be, but are not necessarily, consecutive, and/or evenly spaced.

Reducing the Memory Bandwidth Requirements of Stream Buffers

To reduce wasted bandwidth, the system should avoid useless prefetches (i.e., the system should prefetch with greater accuracy). One way to avoid unnecessary prefetches is to allocate a stream only when a particular reference shows promise of belonging to a stream. The scheme used to reduce memory bandwidth wastage filters-away isolated references and does not present them to the stream buffers. This can be done using the following allocation policy for stream buffers: a stream buffer is allocated when there are misses (note that a miss here means the reference missed both in the primary cache and the stream buffers) to consecutive cache blocks. For example, if there is a miss on a reference to cache block i and then there is a miss on reference to cache block i+1, only then will a stream buffer be allocated for prefetching cache blocks i+2, i+3, and so on. A reference is considered to be isolated if there is no reference to the preceding cache block in the "recent" past.

This policy can be implemented as follows: maintain a list of the N most recent miss addresses in a history table, but store a+1 for miss address a. For every primary-cache miss that also misses in the stream buffers, the miss address is compared with the addresses stored in the history table. If there is a hit, this means that there were two references, a and a+1, and there is a good possibility that there will be a reference to a+2 and so on. In this case a stream is allocated. However, if the miss address does not match in the history table, then a+1 is stored in the history table. (Since the history table is not infinite, the new entry might cause an old entry to be replaced.)

Figure 4:
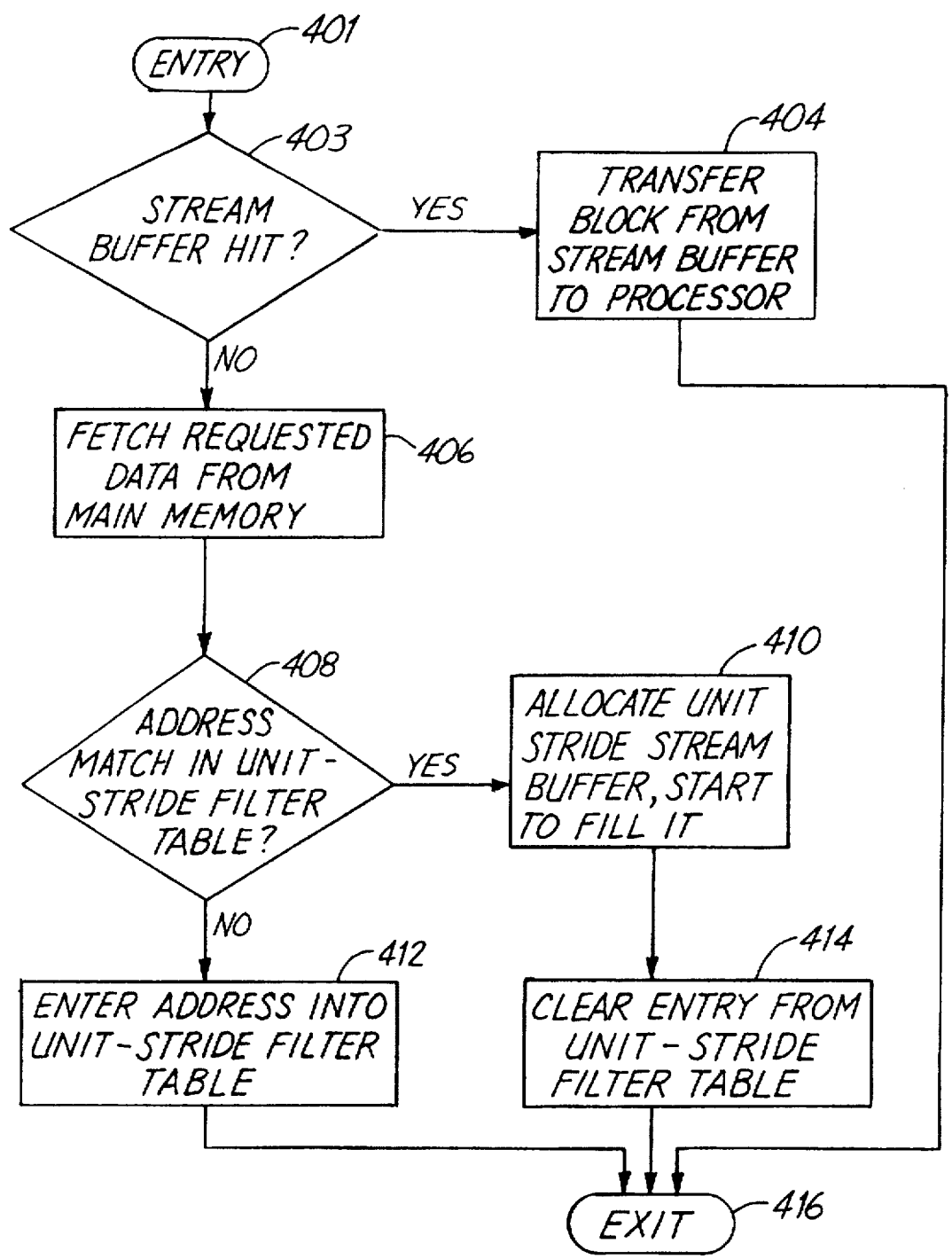
FIG. 4 is a flow chart for a unit-stride stream-buffer filter.

This history table is used in a "filter". A filter can be very useful in making the use of memory bandwidth more efficient. It helps in filtering isolated references away from the stream buffer. The experimental results obtained suggest that a filter of eight to ten entries is sufficient. N is the number of entries in the filter's history table. Also, an entry in the filter need not be allocated for the entire duration of a stream; it is freed as soon as the stream is detected. In one embodiment, a unit-stride stream buffer filter is used to detect unit-stride streams of data. FIG. 4 illustrates a flow-chart of the scheme. This scheme helps in two ways. It reduces the number of unnecessary prefetches, and it prevents active stream buffers from being disturbed. However, the total number of hits could be reduced, since now a stream buffer is allocated only after observing the second reference of a stream of accesses.

Figure 8A:
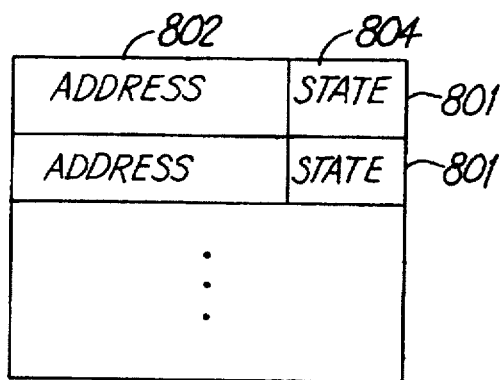
FIG. 8A illustrates a unit-stride history table 140 usable for a unit-stride stream-buffer filter.

FIG. 4 is a flow chart for a unit-stride stream-buffer filter. Block 401 is entered if the microprocessor 100 requests data from main memory 602. If microprocessor 100 has an on-chip cache, this request would typically only be made if a request for data got a "miss" from the on-chip cache or caches. At block 403, a determination is made as to whether there is a "hit" in the stream buffer, and if so, control passes to block 404 where one cache block is transferred from the stream buffer 101 to microprocessor 100. If there was no stream buffer hit at block 403, control passes to block 406. At block 406, a fetch operation is requested for the data from main memory 602, and control passes to block 408. At block 408, a determination is made as to whether there is an "address match" to previously received addresses (Referring to FIG. 8A, a representative unit-stride history table 140 includes a plurality of entry fields 801. Each entry 801 includes address field 802 and state field 804. In one such embodiment, state field 804 includes an indication as to whether the corresponding address field 802 is valid.), and if so, control passes to block 410 where the stream buffer 101 is allocated to this address sequence, and data are requested to fill the stream buffer 101, and control then passes to block 414 where the entry in unit-stride filter table 140 is cleared, and control then passes to exit point 416. If at block 408 there was no match found in unit-stride history table 140, control passes to block 412, where the value of (this address plus one) is entered into unit-stride history table 140, and control then passes to exit point 416.

In one such embodiment, at block 412, unit-stride filter table 140 is filled with a value representing the address of the cache block following the cache block containing first address which just missed at block 408. One way calculating this value is to truncate the first address to an even cache block boundary, and then add the length of a cache block. On a subsequent pass through the flow chart of FIG. 4 testing a second address, at block 408, the address of the cache block containing the second address (i.e., the value of the second address truncated to a cache-block boundary) is compared to the saved incremented cache-block values in unit-stride history table 140. In such an embodiment, unit-stride history table 140 contains addresses truncated to a cache-block boundary, and incremented one cache-block length from the previous access. (This is called a unit-stride-filter history table, because it detects unit strides—accesses which are followed within a "short" time by another access to the next consecutive cache block—and "filters" to those type of access patterns. The "short" time period is the time it takes to get enough accesses that the history table entry of interest is replaced by a later entry. A typical history table will have approximately 5 to 15 entries, so entries will be replaced after approximately 5 to 15 accesses to other address areas.) Compares are then made to the current cache-block address, and if a match is found, the stream buffer is allocated to prefetch a series of cache blocks, continuing to prefetch more cache blocks as the microprocessor 100 accesses cache blocks (and thus empties those cache blocks) from the stream buffer 101. New cache blocks for one stream continue to be prefetched as older cache blocks are read until the stream buffer is reallocated to prefetch another stream.

Figure 5A:
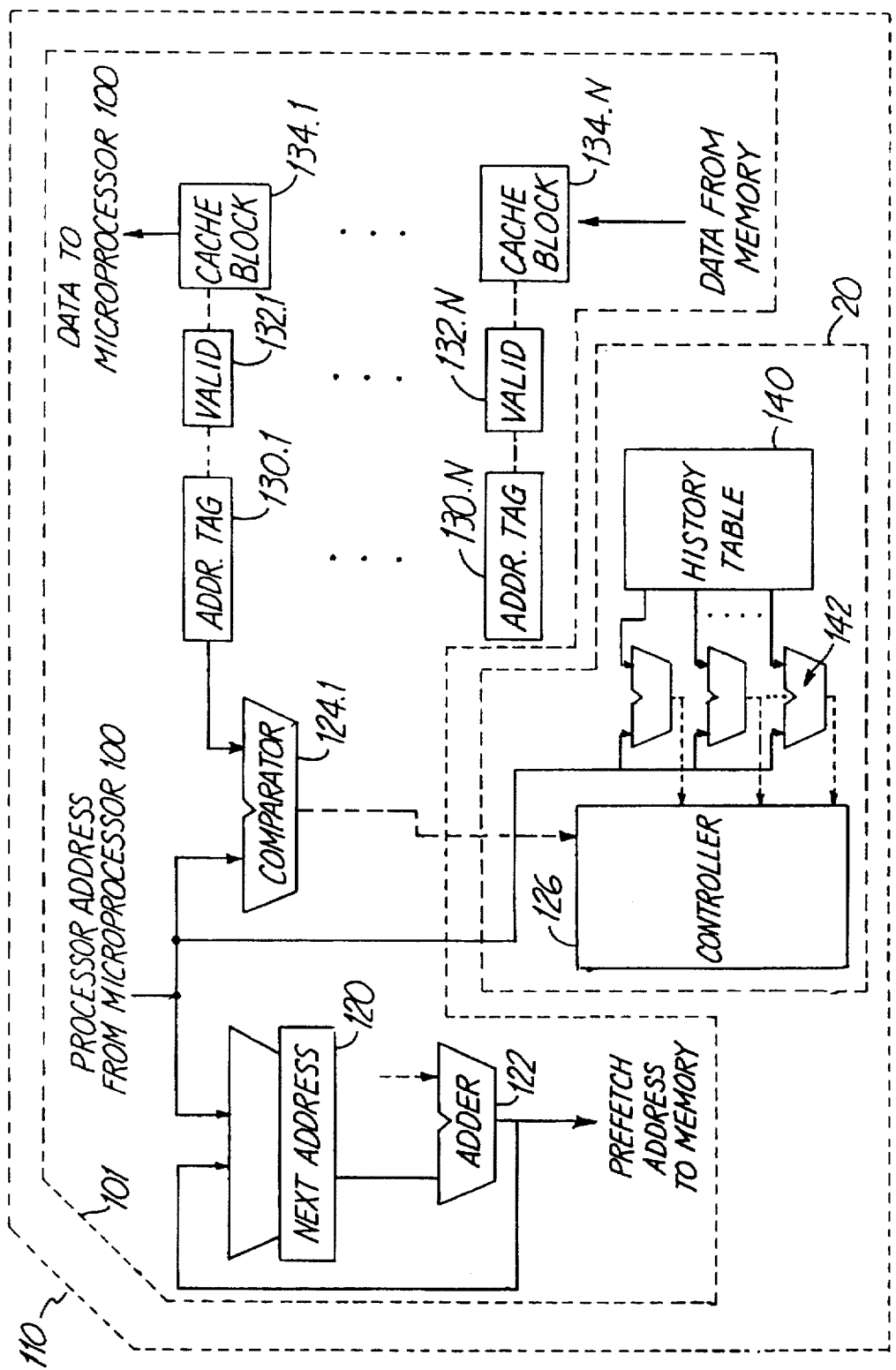
FIG. 5A is a schematic diagram illustrating one embodiment of a filtered stream buffer, which compares only the top cache-block-address-tag register.

FIG. 5A is a schematic diagram illustrating one embodiment of a filtered stream buffer module 110 including a stream buffer 101 and a filter 20. In one such embodiment, a processor address from microprocessor 100 is coupled to comparator 124 which compares the processor address to the value in cache-block-address-tag register 130.1. Cache-block-address-tag register 130.1 contains the address of the data currently in cache block 134.1. Valid bit 132.1 indicates whether or not the data in cache block 134.1 is valid. In this embodiment, there are a plurality of cache-block-address-tag registers 130.1 through 130.N, corresponding to a plurality of cache blocks 134.1 through 134.N, respectively, and a corresponding plurality of validity bits 132.1 through 132.N, respectively. However, when searching for a stream buffer hit, only the first cache-block-address-tag register 130.1 is examined, and even if there may be a hit in cache-block-address-tag registers 130.2 through 130.N, those comparisons are not made. If no stream buffer hit is found, a fetch operation is kicked off, as described above for block 406. The processor address from microprocessor 100 is coupled to plurality of unit-stride comparators 142 which, in parallel, compare the processor address to the values in unit-stride history table 140 substantially simultaneously. In this embodiment, unit-stride history table 140 in FIG. 8A contains unit-stride cache block addresses as described for FIG. 4 above. If an address match is determined for the unit-stride history table 140, controller 126 allocates stream buffer 101 for this stream (series of accesses) by loading the processor address into next address register 120, and setting all validity bits 132.1–132.N to "invalid". Since the access for the current cache block has already been kicked off, adder 122 then increments to the next cache block address for the prefetches, and this incremented address is loaded back into next address register 120. As each requested prefetch cache block data returns from memory, it is loaded into one of the cache blocks 134.1–134.N, the corresponding address for that cache block is loaded into the corresponding cache-block-address-tag register (one of 130.1–130.N), and the corresponding validity bit (one of 132.1–132.N) is set to valid. In one such embodiment, stream buffer 101 is operated as a FIFO (first-in, first-out buffer), so as prefetched cache blocks are requested by microprocessor 100, the top cache block is delivered to microprocessor 100, and each cache-block-address-tag register 130, validity bit 132, and cache block 134 is shifted up one position. Stream buffer hits can only occur at the top position.

Figure 5B:
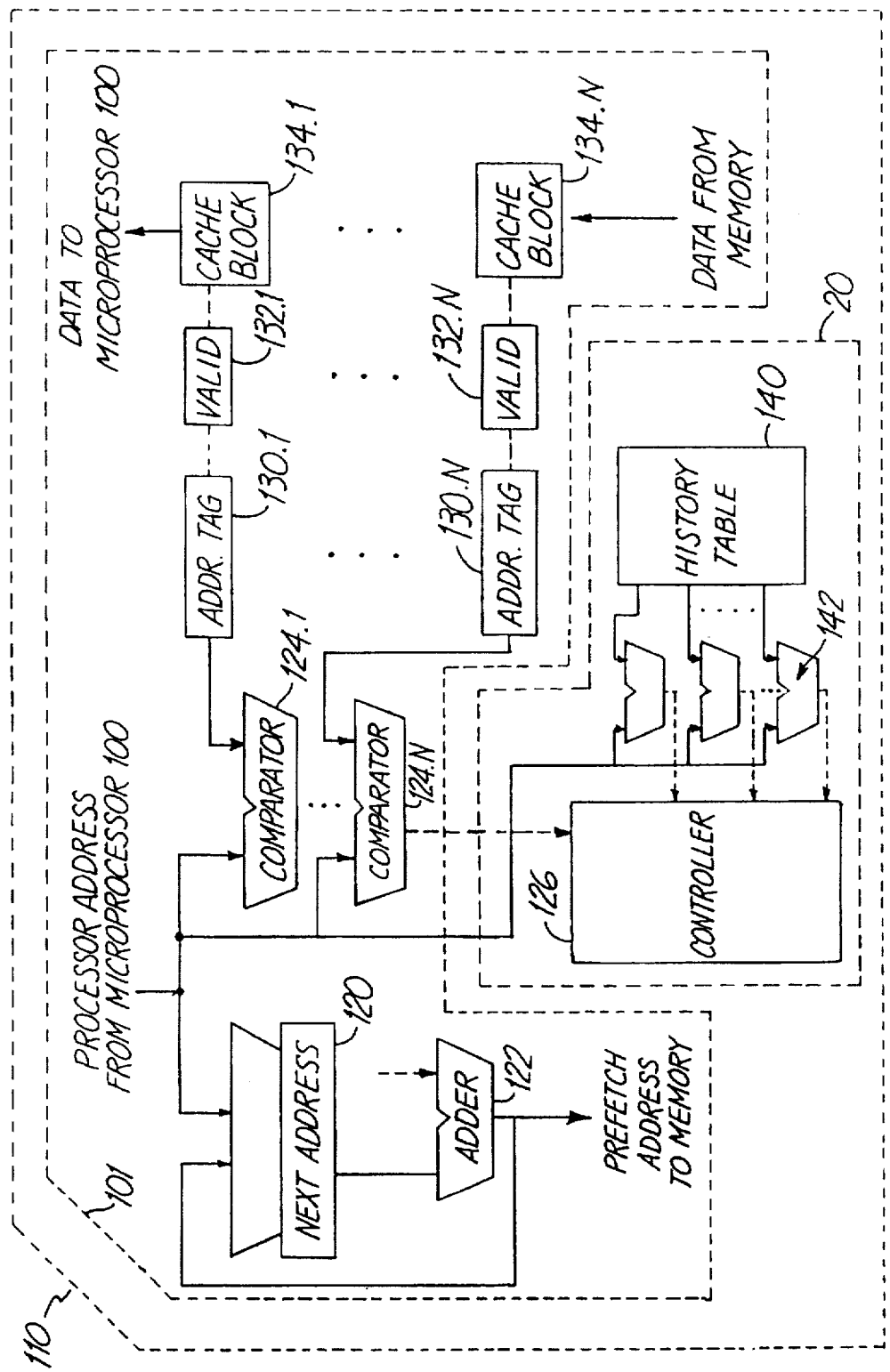
FIG. 5B is a schematic diagram illustrating an alternative embodiment of a filtered stream buffer, which compares all cache-block-address-tag registers.

In another such embodiment, shown in FIG. 5B, the components and operation are much the same as for FIG. 5A with the following exceptions. The processor address from microprocessor 100 is coupled to plurality of comparators 124.1 through 124.N which, in parallel, compare the processor address to the values in cache-block-address-tag register 130.1 through 130.N substantially simultaneously. Thus, a stream-buffer hit can occur at any position 130.1–130.N. In this embodiment, if a stream buffer hit is detected at an intermediate position in the stream buffer, all higher-position data and addresses are discarded, the requested cache block is provided to microprocessor 100, and prefetching continues for this stream. For example, if a stream buffer hit is detected at cache-block-address-tag register 130.3, then validity bits 132.1 and 132.2 are set to "invalid," and all cache-block-address-tag registers 130, validity bits 132, and cache blocks 134 are shifted up two positions. In another such embodiment, controller 126 uses the cache block buffers 134, validity bits 132, and cache-block-address-tag registers 130 as a circular buffer, rather than a FIFO. In the circular buffer embodiment, controller 126 loads cache-block-address tags, validity bits, and cache blocks into fixed positions (e.g., wherein the data is not moved to other positions once it is loaded, but instead pointers are manipulated to track the data in the buffer), and unloads cache blocks from those fixed positions, controlling these data using pointers, as opposed to physically shifting the data as in a FIFO as described above.

Figure 5C:
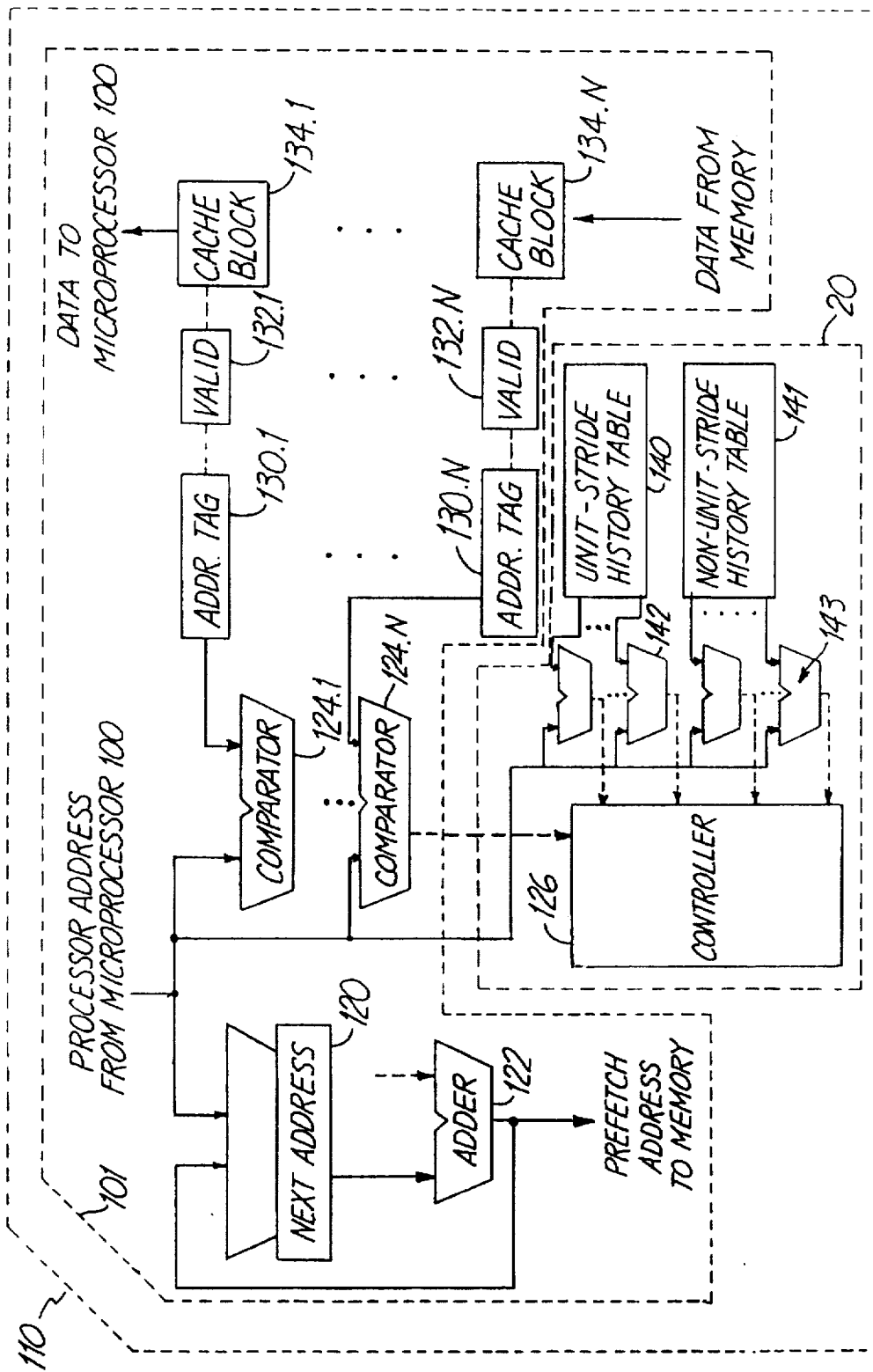
FIG. 5C is a schematic diagram illustrating another alternative embodiment of a filtered stream buffer, including a unit-stride filter and a non-unit-stride filter.
Figure 8B:
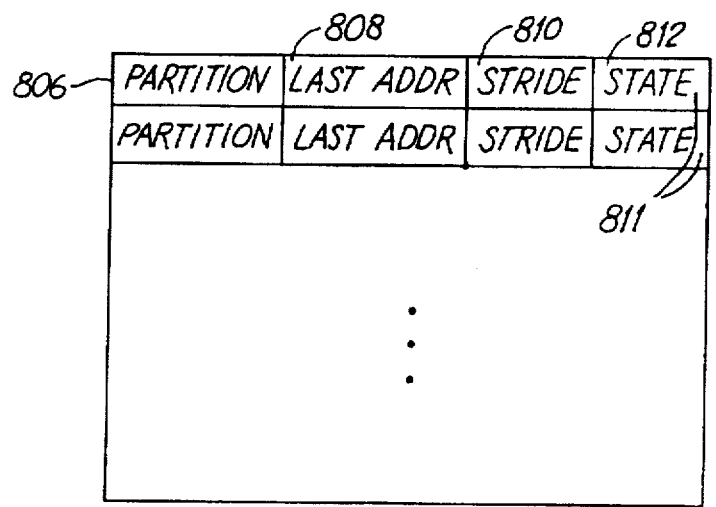
FIG. 8B illustrates a non-unit-stride history table 141 usable for a non-unit-stride stream-buffer filter.

In yet another such embodiment, shown in FIG. 5C, the components and operation are much the same as for FIG. 5B with the following exceptions. FIG. 5C is a schematic diagram illustrating a filtered stream buffer module 110, including a unit-stride filter and a non-unit-stride filter, which compares all cache-block-address-tag registers. Filter 20 includes unit-stride history table 140 and a separate non-unit-stride history table 141, such as shown in FIG. 8B, unit-stride comparators 142 and separate non-unit-stride comparators 143, and controller 126. FIG. 8B is a schematic diagram illustrating a history table usable for a non-unit-stride stream-buffer filter. Each entry 811 includes partition tag field 806, last address field 808, stride field 810,and state field 812. Other arrangements for history tables 140 and 141, and for comparators 142 and 143 are also possible.

Detecting Non-Unit-Stride Reference Patterns

A closer look at the benchmarks revealed that some of them—appsp, fftpde, and trfd—contain significant percentages of large non-unit-stride memory accesses. Stream buffers, as proposed by Jouppi, are inefficient in prefetching cache blocks being accessed in large non-unit strides. In this section ways are shown to extend stream buffers to detect non-unit strides.

Detecting non-unit strides off-chip is harder than detecting them on-chip. Once off-chip, the only information one has are the physical addresses of the data references. But since off-chip logic almost always does not know the PC of the instruction that issued the reference, it is difficult to maintain a similar table off-chip.

Figure 7:
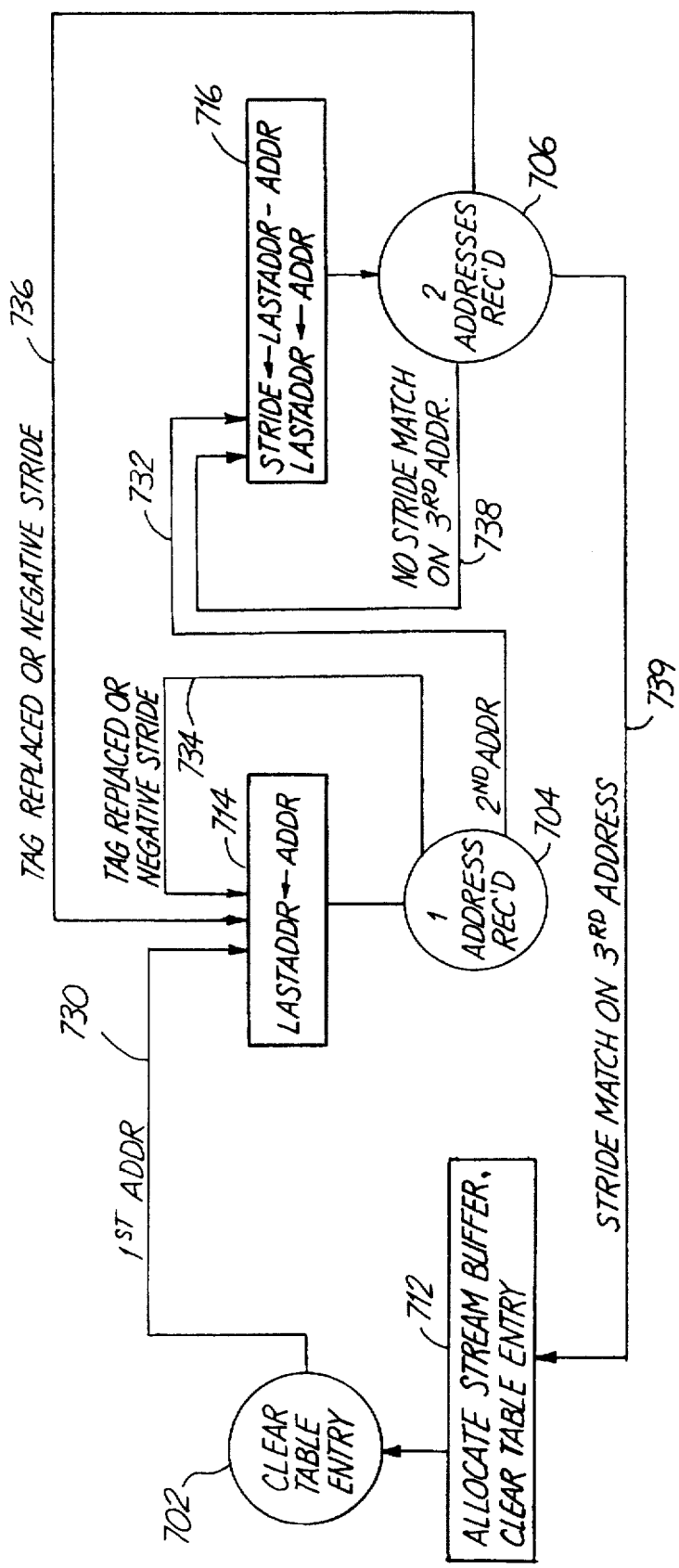
FIG. 7 is a state diagram for a non-unit-stride stream-buffer filter.

The basic idea behind non-unit-stride detection scheme is to dynamically divide the physical-address space into power-of-two partitions and detect "strided" references within each partition. Two references are within the same partition if their addresses have the same partition-tag (higher-order) bits 822. The processor (i.e., program) sets the size of the partition-tag 822 by storing a mask in a memory-mapped location. A non-unit-stride history table 141, shown in FIG. 8B, is used to store the tags of the currently active partitions. This non-unit-stride history table 141 is part of a "non-unit-stride filter". Also, in one embodiment, a finite state machine (FSM) is used to detect the stride for references that fall within the same partition. One embodiment of the FSM used is depicted in FIG. 7. In one such embodiment, the difference between a third address and a second address (called the second stride) is compared to the difference between the second address and a first address (called the first stride). If the strides are equal, the strided-filter logic allocates a strided stream buffer and sets its stride to the calculated stride. In another embodiment, the strides are not required to be exactly equal, but merely to be "substantially" equal to within some epsilon value predetermined by the system user. Partitioning helps in grouping references to an array and analyzing them in isolation to detect strides.

Figure 8C:
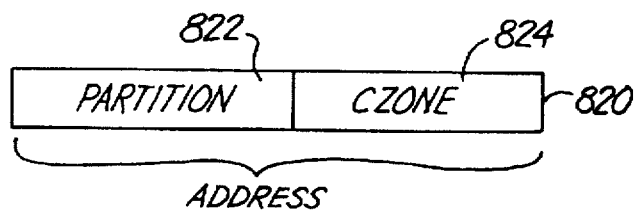
FIG. 8C illustrates the partition 822 and czone 824 of an address 820.

The details of the non-unit-stride detection scheme follow. Referring to FIG. 8C, each word address 820 is divided into two parts: czone 824 (the concentration zone), the size of which is set at run-time, and the partition 822, comprised of the rest of the address bits, not in czone 824. Each entry 811 of the non-unit-stride filter, in addition to the tag 806 of the partition 822, has a few state bits, last address and stride fields which are required to implement the stride-detecting FSM. At the end of three consecutive strided references (the stride between the first and second addresses found equal to the stride between the second and third addresses), a stream is allocated and the entry in the filter table is freed. To minimize the effects this scheme has on the scheme for detecting the common case of unit-strides, the non-unit-stride filter is used behind the unit-stride filter (i.e., the non-unit-stride filter processes only references that have missed in the unit-stride filter). In one such three-address-strided embodiment, only positive strides are considered; references which have an address which is smaller than the most recent reference in the same partition (called a negative stride) reset the filter table entry.

In another embodiment, the difference between a second address and a first address within a partition is used as the calculated stride; the strided-filter logic allocates a strided stream buffer after just two addresses within a partition, and sets its stride to the calculated stride. In one such two-address-strided embodiment, only positive strides are considered; references which have an address which is smaller than the most recent reference in the same partition (called a negative stride) reset the filter table entry.

Other embodiments use other schemes to detect non-unit strides. One that shows similar performance is called the minimum delta scheme. Here, the last N miss addresses are cached and maintained in a history table. When an on-chip miss occurs and it misses in the unit-stride stream buffers, the minimum distance (or delta) is found between the address and any of the entries in the history table. The delta is then used as a stride for the stream. The hardware requirements for this scheme seem to be somewhat more complicated than those for the partition scheme.

Figure 6:
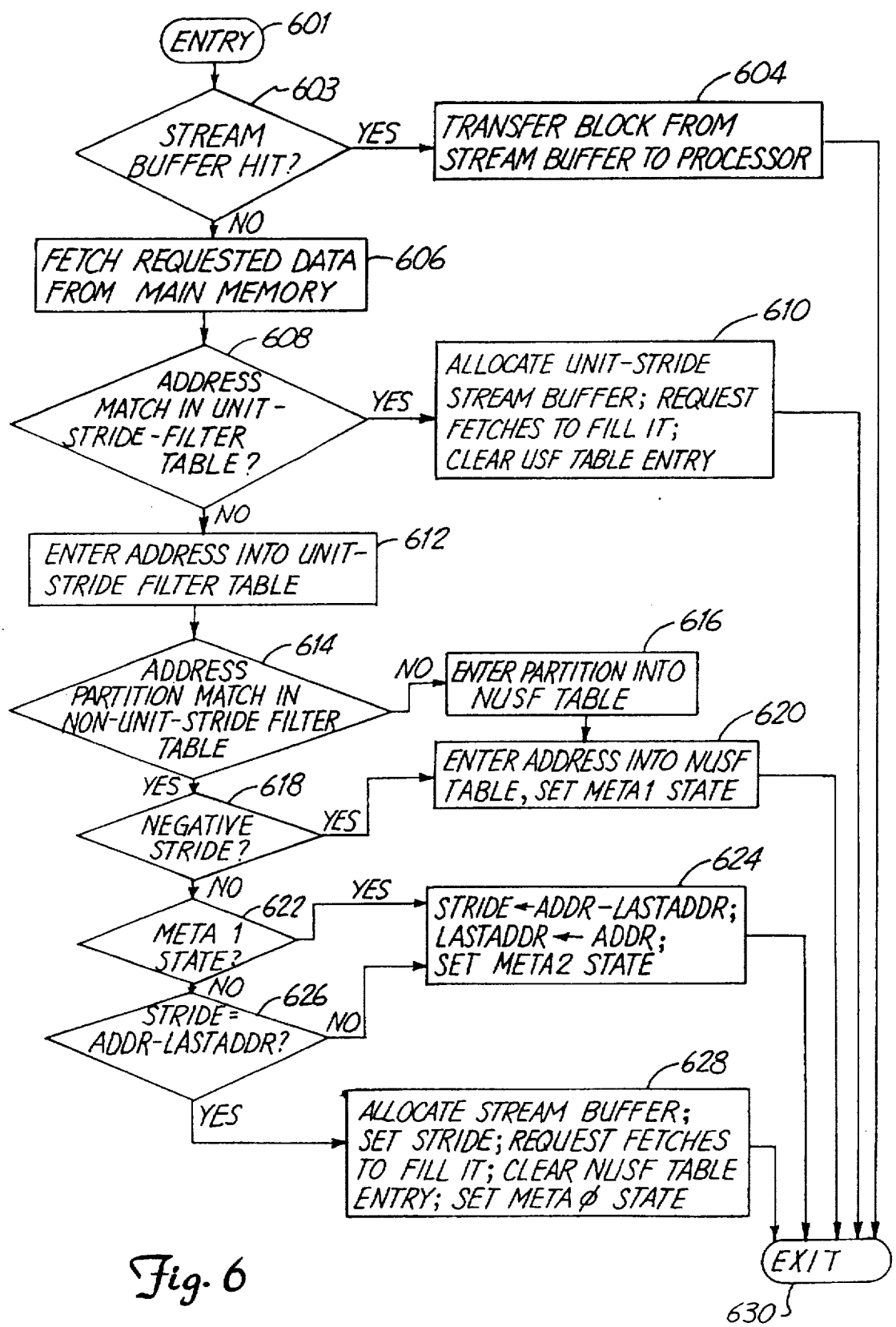
FIG. 6 is a flow chart for an embodiment having a non-unit-stride stream-buffer filter combined with a unit-stride stream-buffer filter.

FIG. 6 is a flow chart of one embodiment of a filtered stream buffer module 110 such as that shown in FIG. 5C having both non-unit-stride stream-buffer filters and unit-stride stream-buffer filters. Block 601 is entered if the microprocessor 100 requests data from main memory 602. In an embodiment in which microprocessor 100 has an on-chip cache, this request would typically be for an entire cache block, and would only be made if a request for data got a "miss" from the on-chip cache or caches. At block 603, a determination is made as to whether there is a "hit" in the stream buffer, and if so, control passes to block 604 where one cache block is transferred from the stream buffer 101 to microprocessor 100, and control passes to exit 630. If there was no stream buffer hit at block 603, control passes to block 606. At block 606, a fetch operation is requested for the data from main memory 602, and control passes to block 608. At block 608, a determination is made as to whether there is an "address match" in unit-stride history table 140 (in this case, the unit-stride filter table of FIG. 8A), and if so, control passes to block 610 where a unit-stride stream buffer 101 is allocated to this address sequence, and data are requested to fill the stream buffer 101, and the entry in the unit-stride history table 140 is cleared, and control then passes to exit point 630. In one such embodiment, as shown in FIG. 5B, a single history table 140 is configured as two table areas: a first table area holding unit-stride entries, and a second table area holding non-unit-stride entries. In another such embodiment, as shown in FIG. 5C, separate tables are used, one table 140 for holding unit-stride entries, and a second table 141 for holding non-unit-stride entries. If at block 608 there was no unit-stride match found in history table 140, control passes to block 612, where the value of this-address-plus-one-cache-block is entered into a unit-stride entry in history table 140, and control then passes to block 614. At block 614, a determination is made as to whether there is an "partition-tag match" in non-unit-stride history table 141 (in this case, with a non-unit-stride filter entry of non-unit-stride history table 141 FIG. 8B), and if not, control passes to block 616 where partition tag 806 of a non-unit-stride entry in non-unit-stride history table 141 is loaded with partition 822 for this address. Referring to FIG. 8C, an address 820 is divided into partition 822, comprised in this embodiment of the upper-order bits, and czone 824, comprised of the lower-order bits. Control then passes from block 616 to block 620, where the czone 824 for this address 820 is loaded into last address field 808, and state "meta1" (i.e., the state where one valid address has been received) is loaded into state field 812, and control then passes to exit 630. If there was a partition match at block 614, control passes to block 618. At block 618, a test is performed to determine whether there was a negative stride (i.e., the current address is smaller that the last address 808), and if so, control passes to block 620, where the czone 824 for this address 820 replaces the value in last address field 808, and state "meta1" is loaded into state field 812, and control then passes to exit 630. If there was a positive stride at block 618, control passes to block 622. At block 622, a test is performed to determine whether the entry is in "meta1" state, and if so, control passes to block 624, where the stride field 810 is set to the current address minus the value from the last address field 808; the last address field is set to the current address; and state "meta2" (i.e., the state where two valid addresses have been received) is loaded into state field 812, and control then passes to exit 630. If the entry was not in "meta1" state at block 622, control passes to block 626. At block 626, a test is performed to determine whether value in stride field 810 is equal to the current address minus the last address field 808 value, and if not, control passes to block 624 (to change the stride, since three addresses were detected in the same partition, but the second stride (between the third and second addresses) was different than the first stride (between the second and first)). At block 624, the stride field 810 is replaced by the current address minus the value from the last address field 808; the last address field is set to the current address; and state "meta2" (i.e., the state where two valid addresses have been received) is reloaded into state field 812, and control then passes to exit 630. If, at block 626, stride field 810 is equal to the current address minus the last address field 808 value, then control passes to block 628, where a strided stream buffer is allocated; the stride for the prefetch incrementor 122 is set to the value contained in stride field 810; fetches are requested to fill the strided filtered stream buffer module 110; and the non-unit-stride-filter table entry is cleared and its state is set to "meta0" (no valid addresses received for this entry); and control then passes to exit 630.

In another embodiment (corresponding to FIG. 5B but with unit-stride history table 140 replaced by non-unit-stride history table 141 of FIG. 8B, and unit-stride comparators 142 replaced by non-unit-stride comparators 143), blocks 608, 610, and 612 of FIG. 6 are omitted, and block 606 passes control to block 614.

An example of a non-unit-strided prefetch follows. Suppose the length of a cache block 134 is eight words (with cache blocks thus starting on aligned boundaries of 0, 8, 16, 24, etc.), and a program running in microprocessor 100 fetches every twenty-ninth word starting at address one (i.e., words 1, 30, 59, 88, 117, 146, etc.). Ignoring for this example the unit-stride filter and prefetch mechanism, the fetch of word 1 would miss in the stream buffer, and cause a fetch of words 0–7 (one cache block) to the internal processor cache, and the loading of address 1 into a non-unit-stride history table entry 811 of FIG. 8B (partition tag 806 set to zero {the high-order bits of address 1}, last address field 808 set to 1{the low-order bits of address 1}, and state field 812 set to "meta1"). The fetch of word 30 would also miss in the stream buffer, and cause a fetch of words 24–31 (the one aligned cache block containing address 30) to the internal processor cache, and the loading of address 30 into the non-unit-stride history table entry 811 (partition tag 806 still at zero, last address field 808 set to 30, stride field 810 set to 29, and state field 812 set to "meta2"). The fetch of word 59 would also miss in the stream buffer, and cause a fetch of words 56–63 (the one aligned cache block containing address 59) to the internal processor cache. Here, however, address 59 matches the non-unit-stride history table entry 811 (partition tag 806 still at zero, 59 minus last address field 808 value of 30 equals stride field 810 value of 29), so a strided stream buffer is allocated. Note that, in this embodiment, the entire address is used in next address register 120 (rather than being truncated to a cache block alignment, as in some embodiments of the unit-stride stream buffer), in order that the exact cache blocks containing the words predicted to be in the strided stream are fetched. In another embodiment, aligned cache blocks are still prefetched. Thus, filtered stream buffer module 110 will prefetch the cache block having words 88–95 for predicted word 88, the cache block having words 112–119 for predicted word 117, and the cache block having words 144–151 for predicted word 146, etc.

FIG. 7 is a state diagram of a non-unit-stride stream-buffer filter usable with the flow chart of FIG. 6 and the hardware of FIG. 5B. Each entry of non-unit-stride history table 140 starts at state "meta0" 702 as a clear table entry. As the first address is received, a transition 730 is made through box 714 to state "meta1" 704, having 1 valid address (but no stride). Box 714 loads the received address into partition tag field 806 and last address field 808. As the second address is received, a transition 732 is made through box 716 to state "meta2" 706, having 2 valid addresses (and thus a stride). Box 716 loads the stride into stride field 810, and the appropriate bits of the received address into last address field 808. If no clear entries are available and an address is received which matches no partition tag, one of the existing entries must be replaced using transition 734 or 736. In one embodiment, a LRU scheme is used to replace the oldest entry with the new partition tag and first address. If the partition tag matches, but a negative stride is detected, the last address is replaced, also using transition 734 or 736. If, from state "meta2" 706, a positive stride is detected, but the stride is different than the previous stride for this partition, transition 738 is used to change the stride. If a stride match is detected on the third address, transition 739 is made through box 712 to state "meta0" 702. Box 712 allocates the strided stream buffer and clears the non-unit-stride filter table entry.

Figure 9:
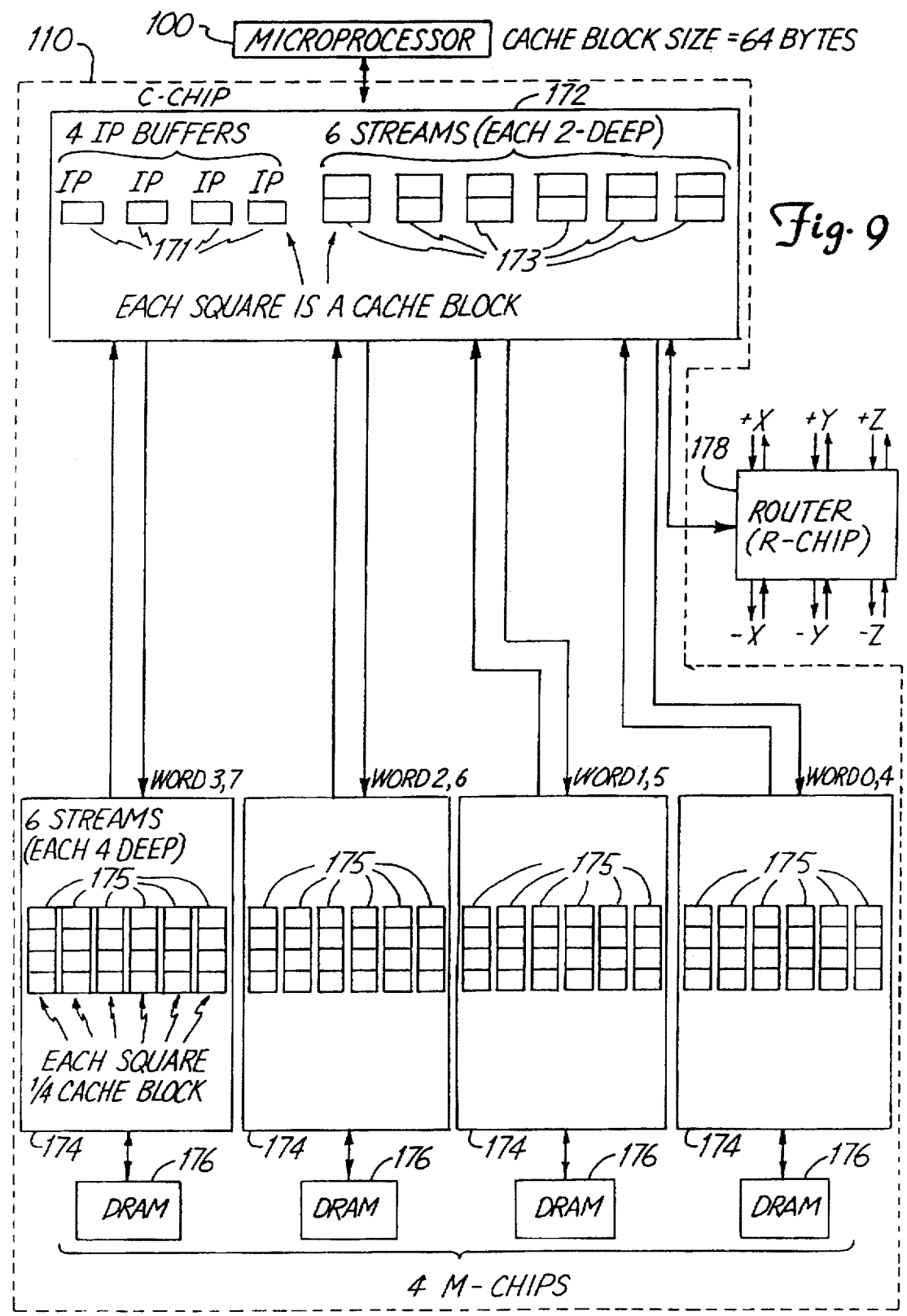
FIG. 9 is a schematic diagram illustrating one embodiment of a system having a filtered stream buffer including speculative initial prefetch stream buffers 171, first sequential stream buffers 173, and secondary sequential stream buffers 175.

FIG. 9 is a schematic diagram illustrating yet another embodiment of a filtered stream buffer 110. In FIG. 9, stream buffers 173 are supplemented by speculative initial prefetch stream buffers 171, and deep sequential stream buffers 175. In one such embodiment, microprocessor 100 has an internal cache having a cache block size of 64 bytes. FIG. 9 shows four initial prefetch stream buffers 171, each containing a one-deep stream buffer (and 64 bytes wide) used for speculative prefetches. These speculative prefetches are fetched from the next sequential cache block address in DRAM 176 if a stream buffer miss is detected, and filled after the requested cache block is transferred to microprocessor 100. Six sequential stream buffers 173, each two-deep and 64 bytes wide are used to prefetch "known" strided data. These stream buffers are used both for strides of one (unit-stride data), as well as for larger strides (non-unit-stride data). In the embodiment shown in FIG. 9, initial prefetch stream buffers 171 and stream buffers 173 are part of an integrated circuit 172 ("C-Chip"). Each of the six sequential stream buffers 173 is extended with sequential stream buffers 175 on four M-chips 174, each of which is 4 deep and 16 bytes wide. Each M-chip 174 contributes ¼ the width for each stream buffer 173. In one such embodiment, R-chip 178 is connected to other R-chips 178 as part of a massively parallel computer system in a three dimensional torus.

FIG. 10 is a table showing aggressiveness options for a filtered stream buffer module 110 such as the embodiment shown in FIG. 9.

The stream buffer implementation of the present invention is a high-performance memory system design that is unique in several aspects. A number of active sequential data streams are concurrently prefetched from a secondary cache into corresponding stream buffers. Processor primary cache misses first consult the stream buffers; if the data words needed have already been prefetched, they are immediately returned without the need to consult any secondary cache. This provides low-latency and high-bandwidth data access to data-reference patterns that include sequential streams.

The present invention's use of stream buffers is significantly different from, and enhances, the original concepts of stream buffers as described in the Jouppi reference. First, rather than prefetch data from a secondary cache as proposed in the Jouppi, one embodiment uses stream buffers as a replacement for a cache level. Data words are prefetched directly from main (DRAM) memory into the stream buffers. This allows a tight integration of the streaming mechanism with the capabilities of the DRAM memory banks. DRAM memory device characteristics are such that best performance is possible only for sequential accesses. Even though the processor may request the streaming data in small pieces, the stream-buffer implementation of the present invention prefetches stream data from the DRAM main memory to the stream buffers in large, sequential, blocks. This integration between the streaming mechanism and the characteristics of the DRAM memory parts provides an inexpensive high-performance memory-system design. It performs well even in the case of fine-grained access to multiple stream buffers that are in conflicting DRAM page locations, since the data for one stream are prefetched in a large, sequential chunk before the data from another stream are prefetched (in another large, sequential chunk).

A second major contribution of the stream buffers of the present invention is the implementation of split buffering. Prefetched data are partitioned into data which are predicted to be "sequential" data (following from past accesses known to be sequential) and data which are "speculative" data. This allows the system to prefetch more aggressively (and efficiently) without polluting the known stream buffers. A prefetch is considered sequential only after sequential references have been received from the processor. In one embodiment, separate facilities are used for speculative and known prefetches; speculative data is prefetched (after as few as a single access request) into one-deep cache-block buffers, thus only performing shallow prefetches for this speculative data; "known" sequential data is prefetched into six-deep strided stream buffers, but only after a pattern of addresses has confirmed such a stream pattern. In one such embodiment, the thresholds for both depth of prefetching and initial conditions which must be met before prefetching is started are adjusted based on how far counters have followed a streaming pattern in the past. For example, if past use of a stream buffer partition has used, e.g., 29 strides, then future uses of the same partition would then aggressively prefetch for up to 29 strides, before changing to a less-aggressive prefetch depth.

One embodiment of the present invention maintains the list of prefetched data, as well as a list of the sequential follow-on addresses of previous processor references that did not cause sequential prefetches (the "history list" contained in the history table). One such embodiment determines that a processor reference is "sequential" if the reference matches either one of the prefetched addresses (including both "sequential" and "speculative" prefetched addresses) or one of the addresses in the history list. Those sequential prefetches derived from references described as "sequential" are prefetched into the "sequential" stream buffers. Those sequential prefetches derived from references not described as "sequential" are typically prefetched into separate "speculative" stream buffers so as not to disturb the known stream data. The "speculative" and "sequential" buffers are managed separately; this is particularly useful when the prefetches into the "sequential" buffers may be made deeper than the prefetches into the "speculative" stream buffers.

A third major contribution of the stream buffers of the present invention is the ability to control the aggressiveness of the prefetching. Under program control, one embodiment of the present invention stream buffer will choose to either (a) do no prefetching, (b) prefetch only references that are determined to be "sequential" by the mechanism described in the previous paragraph (which reduces the memory bandwidth requirements of the stream buffers), (c) prefetch both "speculative" references and "sequential" references (which provides the buffer-partitioned implementation described in the previous paragraph), or (d) treat all references as if they were "sequential" references and prefetch them accordingly (which provides the streaming capabilities of the Jouppi reference).

Verification Methodology: Benchmarks and Simulation Environment

Trace-driven simulation was used as an evaluation methodology. Traces were fed into a stream buffer simulator which generates hit rate and other relevant statistics for the program. Time sampling (see R. E. Kessler, Mark D. Hill, and David A. Wood, "A comparison of trace sampling techniques for multi-megabyte caches," TECHNICAL REPORT CS 1048, UNIVERSITY OF WISCONSIN-MADISON, September 1991) was used to reduce the size of the trace files. Tracing was switched on and off for 10,000 and 90,000 references, respectively, so that 10% of the trace was sampled. Fifteen scientific applications, listed in the table in FIG. 11, were used as benchmarks. These Fortran programs were first converted to C using "gcc" and then compiled using gcc (version 2.4.3) with the -O2 option. Complete program runs were traced. The number of instructions executed by each application varied from a few hundred million to a few billion.

Simulations were done assuming 64 KB instruction +64 KB data 4-way set associative caches. The write policy of the data cache is write-back and write-allocate. The caches use a random replacement policy. This cache configuration is thought to be representative of what future processors will have. Also, the associativity minimized the effect of cache conflicts, so that stream buffers could be focused on. (In a direct-mapped cache, victim buffers as described by Jouppi may also be needed.) The table in FIG. 11 shows the base performance of the benchmarks used. The table in FIG. 11 shows that in general, for the input sizes used, the PERFECT codes show much lower primary cache miss rates than the NAS codes. The low miss rates may be partially explained by the small data set sizes selected for the simulations to complete within a reasonable period of time. At the same time, for four of the benchmarks larger data set sizes were found to improve stream buffer performance (as shown in the table in FIG. 12). FIG. 12 is a table of stream buffer hit rates for various benchmarks, and a comparison to the minimum size of a second-level cache required to achieve the same hit rate. It should be mentioned that the benchmark codes were used "as is" and were not modified to make more efficient use of stream buffers.

Performance Metric

Stream hit rate was used as the primary performance indicator. There are a number of reasons for using stream hit rate rather than metrics such as total execution time or effective CPI (cycles-per-instruction). First, hit rates indicate the maximum benefit that stream buffers can provide. Second, there were no previous results (other than Jouppi's original results) to indicate what kind of stream-buffer performance to expect for scientific workloads. Consequently, it is thought that it is important to study a wide variety of benchmarks. Third, this metric does not make the experiments too specific to any particular memory system design details. Also, it is thought that hit rate is an accurate metric for the kind of target systems for which memory bandwidth is "sufficiently" greater than the load data requirements of the processor. (An example of such a target system is the Cray T3D, for which the available raw main memory bandwidth is 600 MB/sec (megabytes-per-second), while the maximum off-chip processor load bandwidth is 320 MB/sec.)

Performance of Unit-Stride-Only Stream Buffers

Figure 13A:
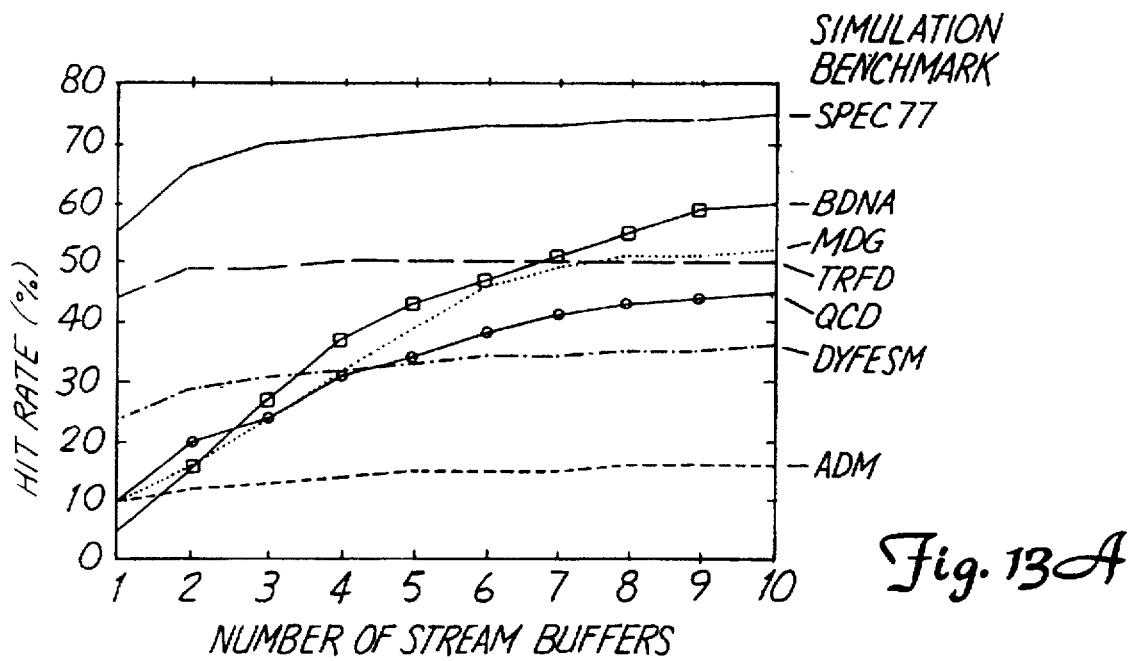
FIG. 13A is a graph showing hit-rate sensitivity to the number of stream buffers for various benchmarks.
Figure 13B:
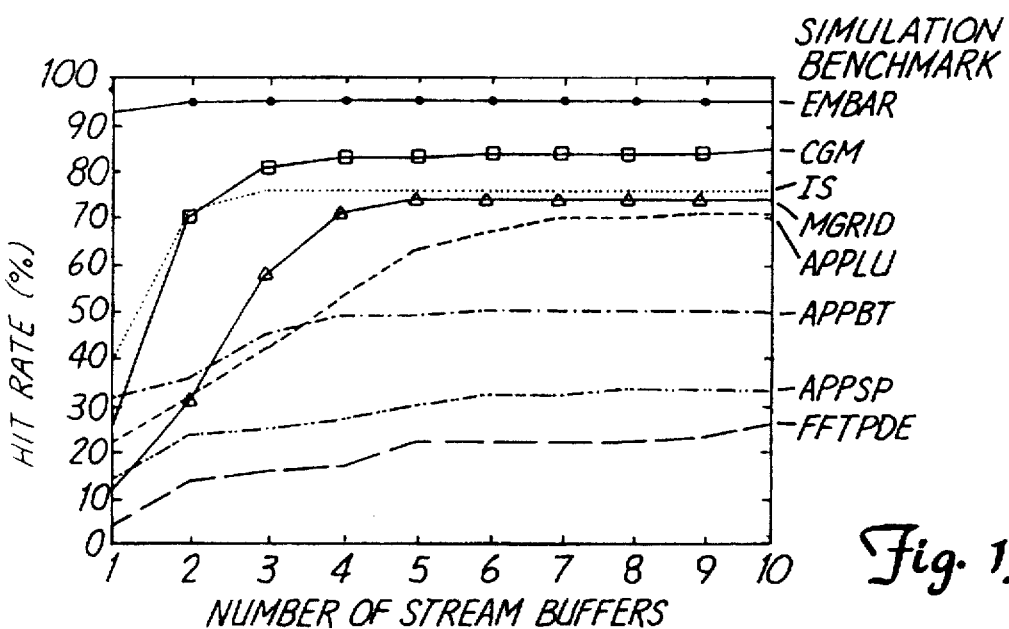
FIG. 13B is a graph showing hit-rate sensitivity to the number of stream buffers for other benchmarks.

While it is easy enough to understand the usefulness of stream buffers for small kernels, it is an entirely different question as to how well stream buffers will perform on larger examples that include real code. FIGS. 13A and 13B show how hit rates vary with the number of stream buffers for the benchmarks used. Hit rates here are the fractions of on-chip misses that hit in the stream buffers. The stream buffers are unified (i.e., they prefetch both instruction and data streams), since splitting the stream buffers into one section for data fetches and another section for instruction fetches was not found to be beneficial, since the relatively large on-chip instruction cache resulted in very few instruction misses.

The majority of the benchmarks shown in FIGS. 13A and 13B show hit rates in the 50–80% range. Also, hit rates plateau as the number of stream buffers is increased. The number of stream buffers at which the hit rate reaches a plateau is related to the number of unique array references in the program loops of the benchmark. For these benchmarks, seven to eight stream buffers suffice. fftpde and appsp from the NAS suite perform poorly, as they have a large number of non-unit-stride references. Similarly, adm and dyfesm show low hit rates since a high percentage of the references made by these programs reference data via array indirections (scatter/gather). Surprisingly, cgm exhibits good stream performance even though it is a sparse matrix program that has a significant number of array indirections.

To judge how good are hit rates in the 50%–80% range, on should note that values of local hit rates for second-level caches are in the 70%–85% range for "typical" applications. Also, for scientific codes this number may often be lower due to the lack of temporal locality in these codes. Hence, the fact that stream buffers achieve comparable, though perhaps slightly lower, hit rates suggests their use as a viable and cost-effective alternative to huge second-level caches. (More comparisons with caches are shown in Section 8.)

Compared to secondary caches, stream buffers require more memory bandwidth. This is because the unnecessary prefetches made by stream buffers consume memory bandwidth. If NUP represents the number of useless prefetches, NC the number of cache misses, and NS the number of stream misses, then the extra bandwidth (EB) can be quantified as follows:

$$EB = NUP/NC$$
$$= (NS * depth)/NC$$
$$= \text{stream miss ratio} * depth$$

A "stream miss" is a cache miss that also misses in the stream buffers. Whenever a stream is re-allocated, it could have up to depth prefetches that have to be flushed. Hence, the total number of useless prefetches will be the product of the number of stream allocations (this is equal to the number of misses since a stream is allocated on every miss) and depth.

FIG. 13A is a graph showing hit-rate sensitivity to the number of stream buffers for various benchmarks. FIG. 13B is a graph showing hit-rate sensitivity to the number of stream buffers for other benchmarks.

FIG. 15A is a graph showing hit-rate with and without a unit-stride filter for various benchmarks. FIG. 15B is a graph showing extra bandwidth required with and without a unit-stride filter for various benchmarks.

The table in FIG. 14 shows the extra bandwidth required by stream buffers. From the table it is clear that ordinary stream buffers, depending on the program, could waste a lot of memory bandwidth. This is especially true for programs for which stream buffers do not perform well (low hit rates). For example, for trfd the extra bandwidth required is as high as 96%. Since memory bandwidth is not free, it is desirable to reduce the amount of extra bandwidth required by stream buffers. Also, it is desirable to reduce the required bandwidth with, at most, a slight reduction in hit rate. The next section describes a technique for doing this.

Hit Rates for Filter-Based Unit-Stride Stream Buffers

The way a filter affects the performance of stream buffers was studied. Ten stream buffers were used for the experiments reported in the rest of this application. FIGS. 15A and 15B show how hit rate and "EB" (the extra bandwidth required), respectively, vary with the addition of a filter. For most of the benchmarks the filter was very effective in reducing EB; often the reduction is more than 50%. For example, the trfd hit rate remains almost the same while EB falls from 96% to 11%. In this case the filter is very successful at eliminating isolated references. Similarly, for is, appsp and cgm EB falls from 48% to 7%, 134% to 45%, and 30% to 13%, respectively, with almost no reduction in hit rate. In the case of fftpde the filter actually increased hit rate by preventing active stream buffers from being disturbed, and EB also fell from 158% to 37%. On the other hand, for appbt, hit rate drops from 65% to 45% and EB falls only from 62% to 48%. This indicates that the filter may not be optimal for all applications, depending on the available memory bandwidth in relation to the processor demands.

These variations in hit rates can be explained by looking at how the stream lengths are distributed. "Stream length" is defined as the number of references after which the regular pattern of accesses is broken. Stream-length distributions are shown in the table in FIG. 16. For most benchmarks stream lengths of less than 5 and greater than 20 constitute a major fraction of the hits. The programs that have a large concentration of small stream lengths show a greater reduction in hit rate when the filter is used. This is obvious since the filter requires two references for verifying a unit-stride pattern of accesses. For example, in the case of appbt the fact that 63% of the hits are from stream lengths of less than 5 explains why the filter reduces the hit rate from 65% to 45%.

The above results show that a filter may often be a good idea since in most cases it reduces the memory-bandwidth requirement of stream buffers for a small or negligible performance tilt. At the same time if the program's memory bandwidth requirement is not high and the memory system is capable of supplying the extra bandwidth, the filter should he deactivated, since the stream buffer hit rate typically falls slightly with the filter.

Performance of Non-Unit-Stride Detecting Scheme

Figure 17:
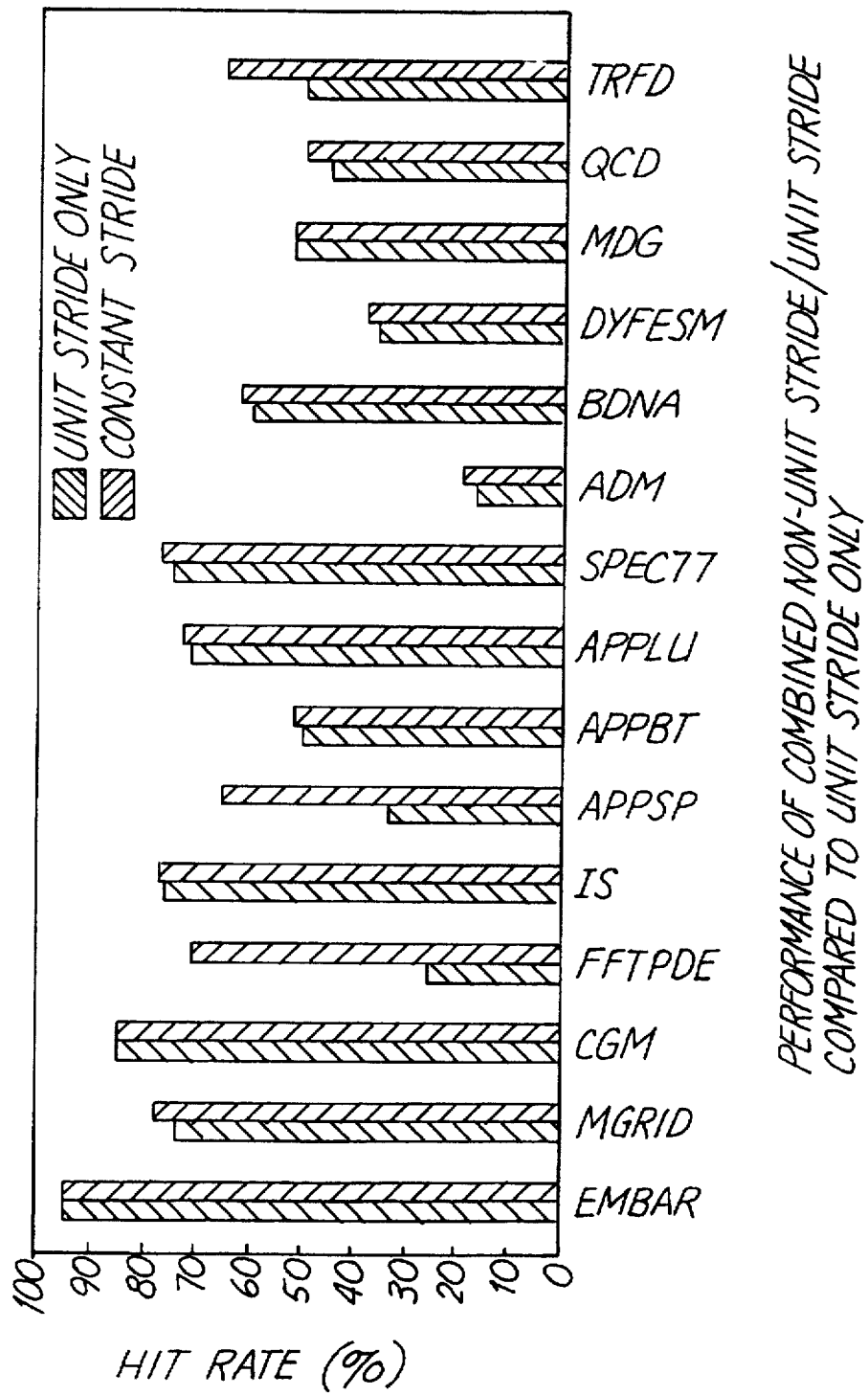
FIG. 17 is a graph showing the performance of various benchmarks for unit-stride filters, compared with combined unit-stride and non-unit-stride filters.

FIG. 17 is a graph showing the performance of various benchmarks for unit-stride filters, compared with combined unit-stride and non-unit-stride filters. The light-shaded bars show hit rate for the unit-stride-filter stream buffer, and the dark-shaded bars show hit rate for the combined unit-stride-filter/non-unit-stride stream buffer as shown in the flowchart of FIG. 6. FIG. 17 shows that for fftpde, appsp, and trfd (programs which have a significant number of non-unit-stride references), the scheme described by the FIG. 6 flow chart of the present invention does well. For example, for fftpde the hit rate increases 26% to 71%. Similarly for appsp and trfd the hit rate improves from 33% to 65% and 50% to 65%, respectively. Gains in other benchmarks are minor.

Figure 18:
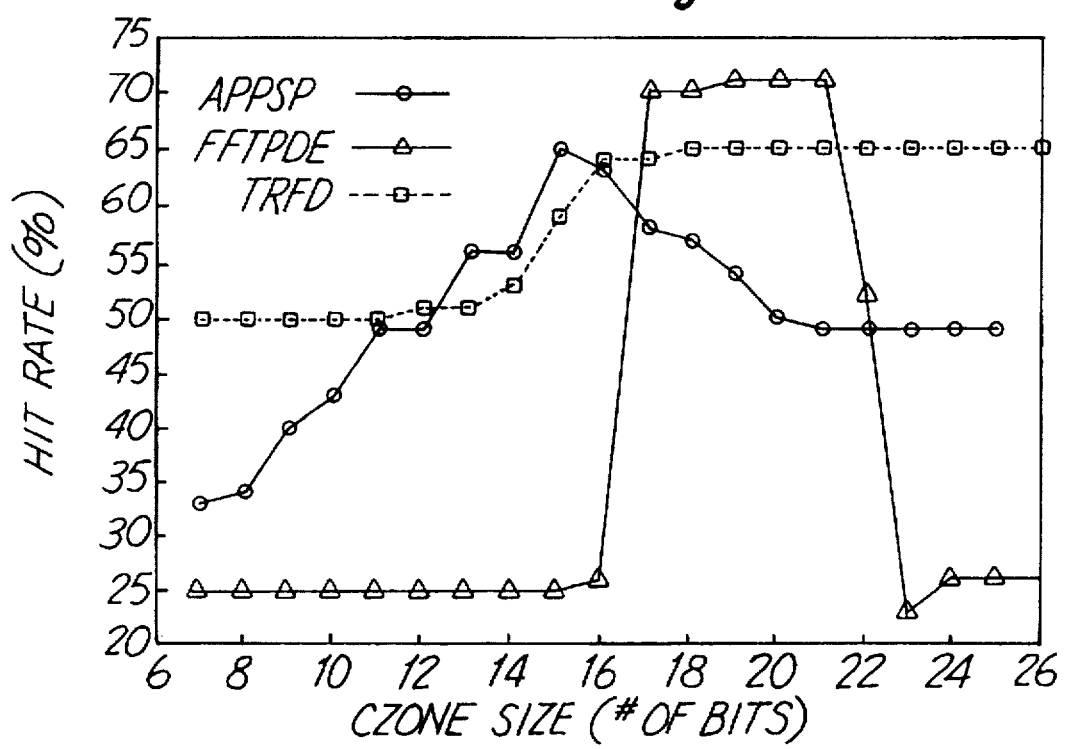
FIG. 18 is a graph showing hit-rate sensitivity to czone size.

FIG. 18 is a graph showing hit-rate sensitivity to czone size. FIG. 18 shows how hit rate varies with the size of czone 824. It indicates that for fftpde the size of czone 824 should lie between sixteen and twenty-three bits for the scheme to be effective. However, for the other two benchmarks, appsp and trfd, a large value for the czone is sufficient to predict most of the non-unit-stride references. This shows that one has to be careful in selecting the size of czone 824; if the size of czone 824 is too small, then three consecutive strided references will not fall in the same partition 822. On the other hand, if czone 824 is too large then references from more than one stream may fall into the same partition 822, and hence disrupt stride detection. The optimal size for czone 824 is a little more than twice the expected stride of the references. Since the size of czone 824 depends on the stride and the array dimensions (in the case of multi-dimensional array references), it is possible for the programmer or the compiler to set the size of czone 822 to a suitable value.

Comparison with Second-Level Caches

For five benchmarks, appsp, appbt, applu, cgm, and mgrid, secondary-cache performance and stream-buffer performance are compared to show how they "scale" with the input size. In particular, the minimum size of the secondary cache required to obtain the same (local) hit rate as stream buffers is determined. For the secondary cache associativities were considered from one-way (direct-mapped) to four-way. Block sizes of 64 and 128 bytes were considered. The results shown in the table in FIG. 12 indicate that stream buffers typically scale better than secondary caches. For example, for applu, when the input size was increased, stream hit rate improved from 62% to 73% while the minimum secondary-cache size for achieving the same hit rate doubled from 1 MB to 2 MB. For all the benchmarks except cgm there was very little temporal reuse and the cache size that had approximately the same miss ratio as stream buffers is proportional to the data-set size. This emphasizes that as the data-set size for scientific programs increases, it may be more cost-effective to exploit the regular pattern in memory references rather than to fit a large data set in a huge second-level cache. The reason for the anomalous behavior of cgm is that for the larger data set the sparse matrix had a very irregular distribution of elements. This benchmark also shows where stream buffers might not perform well—programs that involve widely-scattered array indirections (accesses which use a fetched word not as data, but as an address to fetch other data).

A caveat to the comparison of this section is that it is not entirely fair to directly compare stream buffers and caches via their hit ratios, since a stream buffer entry may have been prefetched but the data words have not returned from memory yet. In the experiment shown, this would be called a hit since the prefetch was correct, but the performance of this case could possibly be more similar to a cache miss since the processor's request for data must wait until the streaming data words return from main memory. The probability of this situation depends highly on the particular memory-system design. It is felt that in many realistic system designs, the depth of the stream buffers will be sufficient that most of the time the stream data will be immediately available, so the direct comparison between hit rates is fair. This is felt to be a balanced comparison since, depending on the system design, stream-buffer access time on hits may be lower than the access time of a cache on hits because stream buffers do not require a RAM look-up.

The extra memory bandwidth required with a filter can be calculated as was done when the filter was not present. For a filter-based stream buffer, a stream is allocated only when the miss address matches in the filter. Hence, in this case the extra bandwidth (EB) required is $$\begin{aligned} EB &= NUP/NC \\ &= (NS * \text{filter hit ratio} * \text{depth})/NC \\ &= \text{stream miss ratio} * \text{filter hit ratio} * \text{depth} \end{aligned}$$

In this case a stream is allocated only when a reference misses both in the primary cache and the stream buffers and hits in the filter. This explains the factor filter hit ratio in the number of useless prefetches. The above expressions show that there is a trade-off between filter hit rate (but perhaps not stream-buffer hit rate!) and the extra memory bandwidth required by stream buffers.

Two important design parameters for stream buffers are the number of stream buffers and the depth of each stream buffer. The number of prefetched entries in each stream buffer is called the depth of the stream buffer. The optimal depth depends largely on the characteristics of the memory system that backs up the processor. A stream should be deep enough so that it can cover the main-memory latency and supply data to the processor at its maximum rate. Since it is desirable to make as few assumptions about the underlying memory system as possible, a constant stream buffer depth of two is assumed.

Stream buffers were evaluated for efficient memory-system design with scientific codes. Stream buffers were shown to achieve hit rates that are comparable to the (local) hit rates of very large caches. Schemes were described for reducing the memory-bandwidth requirement of stream buffers. For the majority of the benchmarks studied, a hit rate of greater than 60% using only 30% extra main-memory bandwidth was achieved using ten stream buffers. However, stream buffers did not perform as well for benchmarks that had a large number of irregular accesses (e.g., array indirections). Stream buffers were extended to prefetch cache blocks being referenced in non-unit strides. For programs that have significant percentage of non-unit-stride references, the present invention is successful in detecting them. As the data set size of the scientific codes increased, stream buffers typically performed relatively better than large secondary caches. Hence, stream buffers are a viable implementation option for regular scientific workloads and systems with "sufficient" memory bandwidth. Stream buffers can be more economical than large secondary caches for scientific codes: the cost savings of stream buffers over large caches can be applied to increase the main-memory bandwidth, resulting in a system with better overall performance.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A computer system comprising:

a memory;

a computer processor, wherein said processor generates a first address of a first data word in said memory and a second address of a second data word in said memory; and a filtered stream buffer coupled to said memory and said processor, and operating to prefetch data from said memory, said filtered stream buffer comprising:

a cache block storage area;

a filter controller, wherein said filter controller determines whether said second address has a predetermined relationship to said first address, and if so, prefetches stream data into said cache block storage area, wherein said predetermined relationship includes a non-unit stride, wherein said non-unit stride is a simple stride which has data in a pattern which skips at least some cache blocks of a series of consecutive cache blocks, and thus would allow some cache blocks to be skipped.

2. A computer system according to claim 1, wherein said filtered stream buffer further comprises a history table connected to said filter controller, wherein said history table holds one or more values corresponding to addresses generated by said processor.

3. A computer system according to claim 2, wherein an entry in said history table are cleared and/or freed once a stream is detected.

4. A computer system according to claim 2, said filtered stream buffer further comprising:

a cache-block-address tag corresponding to said cache block storage area;

an address-hit comparator coupled to said cache-block-address tag and to said processor; and a filter comparator coupled to said history table and to said processor, wherein:

said address-hit comparator determines whether a miss exists between said first address and a value in said cache-block-address tag and, if so, said filter controller stores a first value based on said first address into said history table;

said address-hit comparator determines whether a miss exists between said second address and a value in said cache-block-address tag and, if so, said filter controller uses said filter comparator to determine whether said second address has a predetermined relationship to said first value.

5. A computer system according to claim 1, wherein said filtered stream buffer further comprises a validity indicator, said validity indicator being associated with validity of a cache block within said cache block storage area.

6. A computer system according to claim 1, wherein said filtered stream buffer controls random access memory (RAM) chips to stream said plurality of consecutive cache blocks from said RAM into said cache block storage area.

7. A computer system according to claim 1, wherein said predetermined relationship further includes a unit stride.

8. A computer system comprising:

a memory;

a computer processor, wherein said processor generates a first address of a first data word in said memory and a second address of a second data word in said memory and a third address of a third data word in said memory; and a filtered stream buffer coupled to said memory and said processor, and operating to prefetch data from said memory, said filtered stream buffer comprising:

a cache block storage area;

a filter controller, wherein said filter controller determines whether a predetermined stream relationship exists among said first, second and third addresses, and if so, prefetches strided stream data into said cache block storage area.

9. A computer system according to claim 8, wherein said predetermined relationship is that a stride between said third address and said first address substantially equals a stride between said first address and said second address.

10. A computer system according to claim 9, wherein said strided stream data skips cache blocks which do not contain data of said strided stream data.

11. A computer system according to claim 8, wherein said filtered stream buffer further comprises a history table connected to said filter controller, wherein said history table holds one or more values corresponding to addresses generated by said processor.

12. A computer system according to claim 8, wherein said filtered stream buffer further comprises a validity indicator associated with validity of a cache block within said cache block storage area.

13. A computer system according to claim 8, wherein said predetermined relationship is that said first address, second, and third addresses correspond to a predetermined pattern of addresses.

14. A computer system according to claim 8, wherein said processor controls a depth of prefetching cache blocks based on a parameter contained in a program running in said processor.

15. A computer system according to claim 8, wherein said processor controls a test of said predetermined relationship based on a parameter contained in a program running in said processor.

16. A filtered stream buffer coupled to a memory and a computer processor, wherein said processor generates a first address of a first data word in said memory and a second address of a second data word in said memory, said filtered stream buffer comprising:

a cache block storage area;

a filter controller, wherein said filter controller determines whether said second address has a predetermined relationship to said first address, and if so, prefetches stream data into said cache block storage area, wherein said predetermined relationship includes a non-unit stride, wherein said non-unit stride is a simple stride which has data in a pattern which skips at least some cache blocks of a series of consecutive cache blocks, and thus would allow some cache blocks to be skipped.

17. A filtered stream buffer according to claim 16, wherein said filtered stream buffer further comprises a history table connected to said filter controller, wherein said history table holds one or more values corresponding to addresses generated by said processor.

18. A filtered stream buffer according to claim 17, wherein an entry in said history table are cleared and/or freed once a stream is detected.

19. A filtered stream buffer according to claim 17, said filtered stream buffer further comprising:

a cache-block-address tag corresponding to said cache block storage area;

an address-hit comparator coupled to said cache-block-address tag and to said processor; and a filter comparator coupled to said history table and to said processor, wherein:

said address-hit comparator determines whether a miss exists between said first address and a value in said cache-block-address tag and, if so, said filter controller stores a first value based on said first address into said history table; said address-hit comparator determines whether a miss exists between said second address and a value in said cache-block-address tag and, if so, said filter controller uses said filter comparator to determine whether said second address has a predetermined relationship to said first value.

20. A filtered stream buffer according to claim 16, wherein said filtered stream buffer further comprises a validity indicator, said validity indicator being associated with validity of a cache block within said cache block storage area.

21. A filtered stream buffer according to claim 16, wherein said predetermined relationship further includes a unit stride.

22. A filtered stream buffer coupled to a memory and a computer processor, wherein said processor generates a first address of a first data word in said memory and a second address of a second data word in said memory, and a third address of a third data word in said memory, said filtered stream buffer comprising:
- a cache block storage area; and
- a filter controller, wherein said filter controller determines whether a predetermined stream relationship exists among said first, second and third addresses, and if so, prefetches strided stream data into said cache block storage area.

23. A filtered stream buffer according to claim 22, wherein said predetermined relationship is that a stride between said third address and said first address substantially equals a stride between said first address and said second address.

24. A filtered stream buffer according to claim 23, wherein said strided stream data skips cache blocks which do not contain data of said strided stream data.

25. A filtered stream buffer according to claim 22, wherein said filtered stream buffer further comprises a history table connected to said filter controller, wherein said history table holds one or more values corresponding to addresses generated by said processor.

26. A filtered stream buffer according to claim 22, wherein said filtered stream buffer further comprises a validity indicator associated with validity of a cache block within said cache block storage area.

27. A filtered stream buffer according to claim 22, wherein said predetermined relationship is that said first address, second, and third addresses correspond to a predetermined pattern of addresses.

28. A filtered stream buffer according to claim 22, wherein said processor controls a depth of prefetching cache blocks based on a parameter contained in a program running in said processor.

29. A filtered stream buffer according to claim 22, wherein said processor controls an aggressiveness test of said predetermined relationship based on a parameter contained in a program running in said processor.

30. A method for controlling a filtered stream buffer coupled to a memory and to a computer processor, wherein said computer processor provides a first address of a first data word in said memory, a second address of a second data word in said memory and a third address of a third data word in said memory, said method comprising the steps of:
- determining whether a predetermined stream relationship exists among said first, second and third addresses; and
- if said determining step determines that said predetermined relationship exists, then prefetching stream data.

31. A method according to claim 30, further comprising the steps of:
- storing a cache block;
- storing a cache-block-address-tag value corresponding to said cache block;
- comparing said cache-block-address-tag value to said third address;
- if said cache-block-address-tag value does not compare to said third address, storing a third history value corresponding to said third address;
- comparing said cache-block-address-tag value to said first address;
- if said cache-block-address-tag value does not compare to said first address, storing a first history value corresponding to said first address;
- comparing said cache-block-address-tag value to said second address;
- if said cache-block-address-tag value does not compare to said second address, determining whether said second address has a predetermined relationship to said first address and said third address; and
- if said determining step determines that said second address has said predetermined relationship to said first address, prefetching stream data.

32. A computer system according to claim 31 wherein: said third history value comprises an address partition and a concentration zone.

33. A method according to claim 30, further comprising the step of storing values corresponding to said third address and said first address into a history table.

34. A method according to claim 30, wherein said predetermined relationship is that a stride between said third address and said first address is substantially equal to a stride between said first address and said second address.

35. A method according to claim 30, wherein at least some of said strided cache blocks comprise data for non-consecutive cache blocks.

36. A filtered stream buffer coupled to a memory and to a computer processor, wherein said computer processor provides a first address of a first data word in said memory and a second address of a second data word in said memory; said filtered stream buffer comprising:
- a history-buffer that stores a first history value corresponding to said first address;
- a cache-block-storage that stores a cache block;
- a cache-block-address-tag storage that stores a cache-block-address-tag value corresponding to said cache block, wherein said tag value represents most-significant bits but fewer bits than all bits of the first address;
- an address-hit-comparator coupled to the cache-block-address-tag storage that receives corresponding most-significant bits of said second address and compares said cache-block-address-tag value to the corresponding most-significant bits of said second address;
- a filter-comparator that receives said second address and determines whether said second address has a predetermined relationship to said first address, wherein the predetermined relationship includes a non-unit-stride relationship, wherein said non-unit stride is a simple stride which has data in a pattern which skips at least some cache blocks of a series of consecutive cache block, and thus would allow some cache blocks to be skipped; and
- a filter-controller that prefetches stream data if said filter-comparator determines that said second address has said predetermined relationship to said first address.

37. A filtered stream buffer according to claim 36, wherein said filtered stream buffer further comprises validity-indicator means for indicating the validity of said cache block.

38. A filtered stream buffer according to claim 36, wherein said predetermined relationship is a unit stride.

39. A filtered stream buffer according to claim 36, wherein:
- if said address-hit-comparator means determines a miss between said first address and a cache-block-address-tag value in said cache-block-address-tag means, said first value is stored into said history-buffer means;
- if said address-hit-comparator means determines a miss between said second address and a cache-block-address-tag value in said cache-block-address-tag means, said filter-comparator means is used for determining whether said second address has said predetermined relationship to said first address.

40. A filtered stream buffer coupled to a memory and to a computer processor, wherein said computer processor provides a first address of a first data word in said memory, a second address of a second data word in said memory, and a third address of a third data word in said memory, said filtered stream buffer comprising:
- a history-buffer that stores information corresponding to said first address and said second address;
- a cache-block storage that stores a cache block;
- a cache-block-address-tag storage that stores a cache-block-address-tag value corresponding to said cache block, wherein said tag value represents most-significant bits but fewer bits than all bits of the first address;
- an address-hit-comparator coupled to the cache-block-address-tag storage that receives corresponding most-significant bits of said second address and compares said cache-block-address-tag value to the corresponding most-significant bits of said second address;
- a filter-comparator that receives said information from said history-buffer and said third address and determines whether a predetermined stream relationship exists among said first, second, and third addresses, and
- a filter-controller that prefetches stream data into said cache-block storage if said filter-comparator determines that a predetermined stream relationship exists among said first, second and third addresses.

41. A filtered stream buffer according to claim 40, further comprising validity-indicator means for indicating the validity of said cache block.

42. A filtered stream buffer according to claim 40, wherein:
- said address-hit-comparator means determines whether a miss exists between said first address and a cache-block-address-tag value in said cache-block-address-tag means and, if so, said filter-controller means stores a first value based on said first address into said history-buffer means;
- said address-hit-comparator means determines whether a miss exists between said second address and a cache-block-address-tag value in said cache-block-address-tag means and, if so, said filter-controller means stores a second value based on said second address into said history-buffer means;
- said address-hit comparator means determines whether a miss exists between said third address and a value in said cache-block-address-tag means and, if so, said filter-controller means controls said filter-comparator means to determine whether said predetermined relationship exists among said first, second and third addresses, and if so, prefetches strided stream data into said cache block storage means.

43. A method for controlling a filtered stream buffer coupled to a memory and to a computer processor, wherein said computer processor provides a first address of a first data word in said memory and a second address of a second data word in said memory; said method comprising the steps of:
- determining whether said second address has a predetermined relationship to said first address, wherein said predetermined relationship includes a non-unit stride, wherein said non-unit stride is a simple stride which has data in a pattern which skips at least some cache blocks of a series of consecutive cache blocks, and thus would allow some cache blocks to be skipped; and
- if said determining step determines that said second address has said predetermined relationship to said first address, then prefetching stream data.

44. A method according to claim 43, further comprising the step of storing a value corresponding to said first address into a history table.

45. A method according to claim 43, wherein said predetermined relationship is a unit stride.

* * * * *